(12) United States Patent
Eckel et al.

(10) Patent No.: US 12,285,832 B2
(45) Date of Patent: Apr. 29, 2025

(54) SUCTION-EXTRACTION ADAPTER

(71) Applicant: Robert Bosch GmbH, Stuttgart (DE)

(72) Inventors: Daniel Eckel, Wolfegg (DE); Daniel Beckel, Zürich (CH); Edit Okenwa, Luterbach (CH); Rainer Widmann, Bodnegg (DE); Stefan Sonntag, Vogt (DE); Tamara Gaschler, Ravensburg (DE); Andreas Schurig, Lyss (CH); Ioan Ionescu, Solothurn (CH); Alexander Volz, Baienfurt (DE)

(73) Assignee: Robert Bosch GmbH, Stuttgart (DE)

( * ) Notice: Subject to any disclaimer, the term of this patent is extended or adjusted under 35 U.S.C. 154(b) by 431 days.

(21) Appl. No.: 17/735,779

(22) Filed: May 3, 2022

(65) Prior Publication Data

US 2022/0355430 A1 Nov. 10, 2022

(30) Foreign Application Priority Data

May 6, 2021 (DE) ...................... 10 2021 204 606.1

(51) Int. Cl.
*B23Q 11/00* (2006.01)
*B23B 45/00* (2006.01)

(52) U.S. Cl.
CPC ........ *B23Q 11/0046* (2013.01); *B23B 45/003* (2013.01); *B23Q 11/0071* (2013.01); *B23B 2251/68* (2013.01)

(58) Field of Classification Search
CPC ............ B23Q 11/0046; B23Q 11/0071; B23B 45/003; B23B 2251/68; B23B 51/00; B28D 7/02; B28D 1/146; B28D 1/14; B28D 7/00; B25D 17/02
See application file for complete search history.

(56) References Cited

U.S. PATENT DOCUMENTS

| | | | | |
|---|---|---|---|---|
| 994,430 | A * | 6/1911 | Tunks | B23Q 11/0046 408/72 R |
| 3,422,913 | A * | 1/1969 | Young, Jr. | E21B 17/22 175/323 |
| 4,113,037 | A * | 9/1978 | Wanner | E21B 10/40 175/320 |
| 4,168,753 | A * | 9/1979 | Raibetanz | B28D 1/14 175/218 |
| 5,033,917 | A * | 7/1991 | McGlasson | B23B 49/02 408/241 B |
| 10,016,885 | B2 * | 7/2018 | Ookubo | B25D 11/12 |

(Continued)

FOREIGN PATENT DOCUMENTS

DE 29 18 629 A1 11/1980
DE 100 00 015 A1 7/2001
(Continued)

*Primary Examiner* — Steven A MacDonald
(74) *Attorney, Agent, or Firm* — Maginot, Moore & Beck LLP

(57) ABSTRACT

A suction-extraction adapter for a drilling tool has a housing and a tool connection unit. The housing has a suction-extraction device interface for the detachable connection of a suction-extraction device to the suction-extraction adapter. The tool connection unit enables the axial fixing of the suction-extraction adapter on the drilling tool. The housing also has a locking mechanism. The tool connection unit is configured to be locked on the housing of the suction-extraction adapter via the locking mechanism.

20 Claims, 19 Drawing Sheets

(56) References Cited

U.S. PATENT DOCUMENTS

| | | | | |
|---|---|---|---|---|
| 10,507,557 | B2* | 12/2019 | Meiser | B25D 17/20 |
| 2002/0152731 | A1* | 10/2002 | Reich | B23Q 11/0046 |
| | | | | 55/385.1 |
| 2004/0020671 | A1* | 2/2004 | Lamprecht | B23Q 11/0046 |
| | | | | 173/217 |
| 2005/0268427 | A1* | 12/2005 | Britz | A47L 9/102 |
| | | | | 15/415.1 |
| 2007/0179432 | A1* | 8/2007 | Bar Or | A61B 1/00135 |
| | | | | 604/30 |
| 2009/0317200 | A1* | 12/2009 | Bruntner | B23B 47/00 |
| | | | | 408/67 |
| 2012/0063856 | A1* | 3/2012 | Miwa | B23Q 11/0046 |
| | | | | 408/67 |
| 2013/0183111 | A1 | 7/2013 | Lerch et al. | |
| 2013/0319711 | A1* | 12/2013 | Simm | A47L 9/1409 |
| | | | | 173/197 |
| 2017/0087707 | A1* | 3/2017 | Appel | B23B 47/34 |
| 2017/0203402 | A1 | 7/2017 | Machida et al. | |
| 2018/0085873 | A1* | 3/2018 | Rompel | B23Q 11/0046 |
| 2018/0200852 | A1 | 7/2018 | Yoshikane | |
| 2018/0311778 | A1* | 11/2018 | Meiser | B23Q 11/0071 |
| 2019/0247991 | A1* | 8/2019 | Hartmann | B25D 17/20 |
| 2020/0230765 | A1* | 7/2020 | Sonntag | B23B 51/0493 |

FOREIGN PATENT DOCUMENTS

| | | |
|---|---|---|
| DE | 10 2016 014 210 A1 | 10/2017 |
| DE | 10 2017 125 901 A1 | 5/2019 |
| DE | 10 2019 205 656 A1 | 11/2019 |

\* cited by examiner

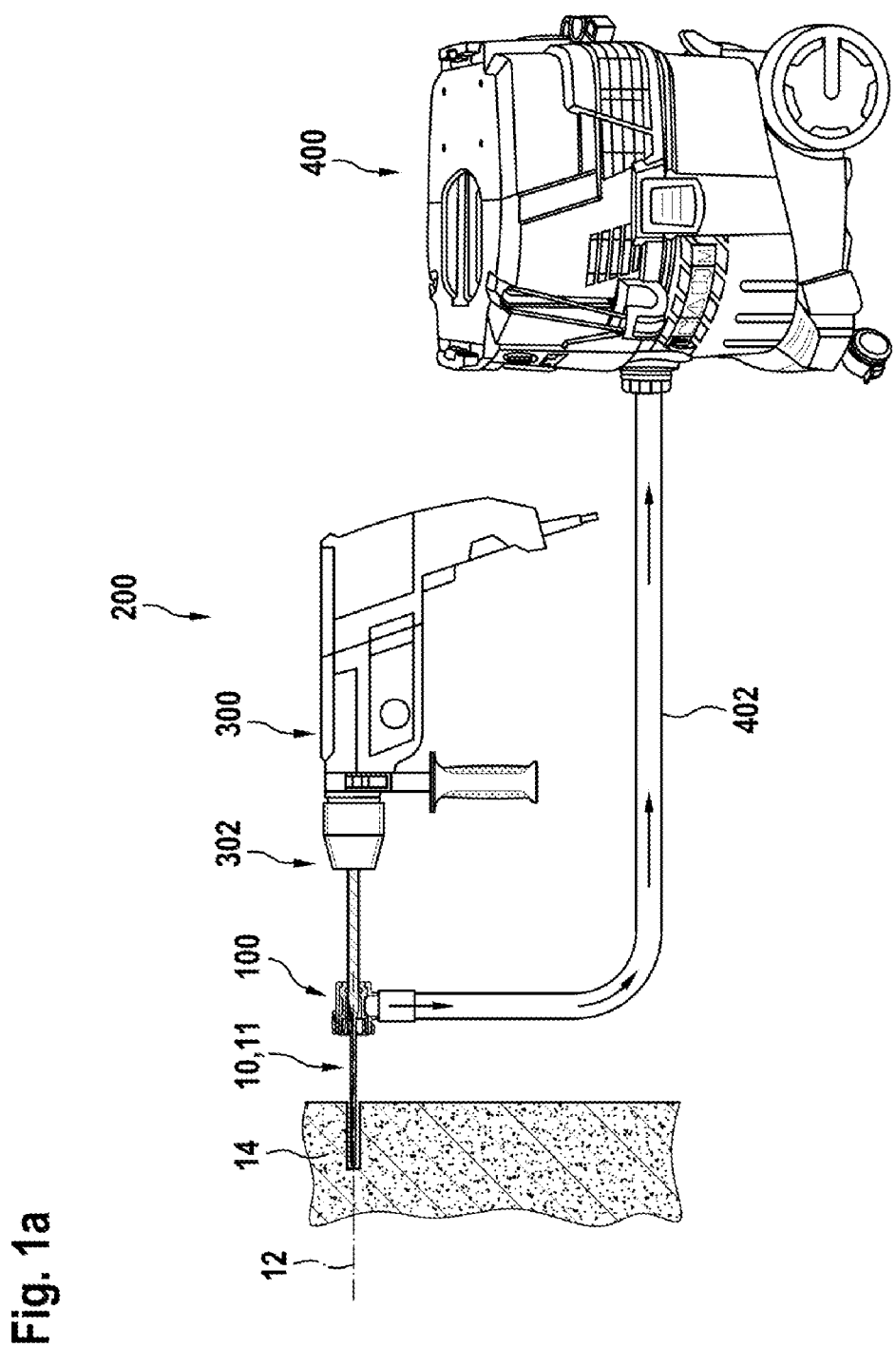

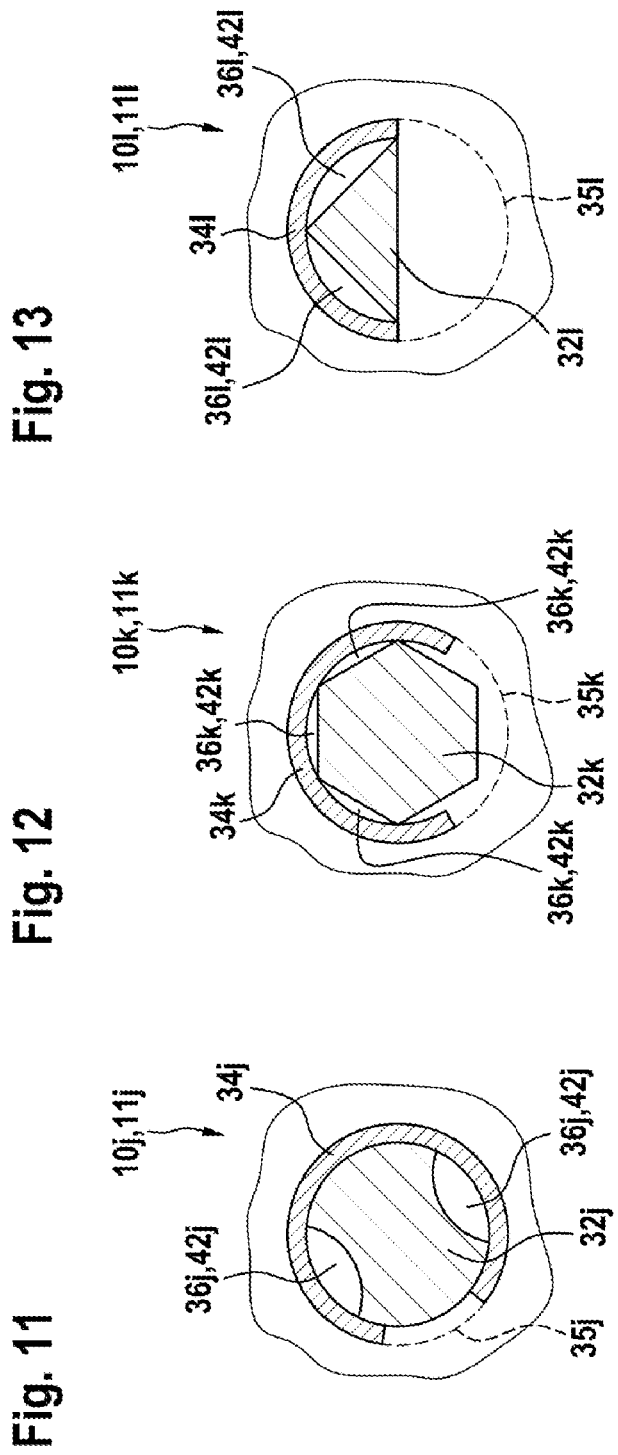

SUCTION-EXTRACTION ADAPTER

This application claims priority under 35 U.S.C. § 119 to patent application no. DE 10 2021 204 606.1, filed on May 6, 2021 in Germany, the disclosure of which is incorporated herein by reference in its entirety.

BACKGROUND

One example of an existing drilling tool is described in DE 10 2019 205 656 A1 which relates to a drilling tool having a transporting channel covered by a sleeve element.

SUMMARY

The disclosure relates in particular to a drilling tool, in particular a rock drill, which extends along a longitudinal axis, comprising a drill head, an inserting end, a basic body, a covering element and a transporting region, which is arranged between the drill head and the inserting end, and at least one transporting channel, which extends along the transporting region, wherein the transporting channel is arranged radially between the covering element and the basic body, wherein the covering element is arranged entirely outside the basic body and has a gap. It is proposed that the gap of the covering element takes up an angle range between 30° and 270° when viewed in cross section. This advantageously makes it possible to realize a secure connection between the basic body and the covering element.

The drilling tool is in particular in the form of a rock drill intended for a hammer drill. At its end facing away from the drill head, the drilling tool has the inserting end, which is designed for coupling to a handheld power tool, such as a hammer drill, for example. As a preference, the drilling tool is designed in the region of the inserting end in such a way that the drilling tool can be coupled to a tool receptacle of the handheld power tool. By way of example, the drilling tool in the region of the inserting end may have form-fitting elements in the form of special grooves which form an SDS-plus interface or an SDS-max interface. To machine a workpiece, the drilling tool is set by means of the hammer drill into a rotating and linearly oscillating or percussive state. During the machining, the drilling tool penetrates into the workpiece in the advancing direction of the drilling tool. The advancing direction of the drilling tool runs coaxially to the longitudinal axis of the drilling tool and, starting from the inserting end, in the direction of the drill head. The longitudinal axis of the drilling tool corresponds in particular to a working axis or axis of rotation of the drilling tool.

In this context, a drill head is to be understood to mean in particular a region of the drilling tool that has at least one cutting body. The cutting body has at least one cutting element, which may be in the form of a main cutting element or an auxiliary cutting element. The cutting elements are in particular made from a hard metal. As a preference, the cutting elements have a higher hardness than the basic body. Each cutting element has at least one cutting edge. The cutting edge corresponds to the intersecting lines of a rake surface and a free surface of the cutting element. Each cutting element preferably has a single cutting edge. As an alternative, the cutting element may also have multiple cutting edges which in particular transition into one another. In particular, the region of the drill head is spanned by the at least one cutting body. As a preference, the cutting body has at least two cutting elements, preferably at least four cutting elements. The cutting body is connected to the drilling tool in particular via a material bond. As a preference, the drill head is in the form of a solid hard metal head, wherein an individual cutting body with at least one cutting element is connected to the basic body via a blunt surface, preferably via a welded connection. As an alternative, it is also conceivable that the drilling tool has incisions in which the at least one cutting body, in the form of a small hard metal plate, is inserted and in particular connected via a soldered connection. In this context, the welded connection differs from the soldered connection in particular in that the components to be connected are partially melted in the case of the welded connection.

The transporting channel is in particular designed to transport a fluid, preferably an air stream, within the drilling tool. The transporting channel is preferably provided to extract drilling cuttings within a drilled hole by suction during a drilling operation. The drilling cuttings are preferably transported in the opposite direction to the advancing direction of the drilling tool. The transporting channel has a suction opening and a suction-extraction opening, the spacing between which corresponds to the length of the transporting channel. The suction opening is arranged in particular in the region of the drill head, preferably directly behind the drill head. The transporting channel may have an eccentric or concentric form. An eccentric or concentric transporting channel is to be understood to mean in particular a transporting channel that runs eccentrically or concentrically, respectively, to a longitudinal axis of the drilling tool up to at least 70% of its length, preferably up to at least 90% of its length, preferentially substantially along its entire length. The drilling cuttings can enter the transporting channel via the suction opening. The drill head preferably comprises at least one suction opening. The suction opening and the suction-extraction opening may be arranged substantially parallel to one another, preferably substantially perpendicularly to one another.

In addition, the drilling tool has a connection region designed to connect the drilling tool to a suction-extraction adapter. The suction-extraction adapter is provided for the in particular detachable connection of the drilling tool to a suction-extraction device.

The connection region has in particular at least one connection element designed to connect the drilling tool to a suction-extraction adapter. The suction-extraction adapter in the connected state is preferably partially movable in relation to the drilling tool, in particular movable in relation to the basic body of the drilling tool. In particular, the suction-extraction adapter is connected axially immovably and rotatably in such a way that the suction-extraction adapter is substantially fixed axially on the drilling tool and the drilling tool can rotate within the suction-extraction adapter. In particular, the suction-extraction adapter is fixed on the drilling tool with play. The suction-extraction opening may be arranged in the connection region. As a preference, the transporting channel is arranged partially in the connection region.

The basic body is preferably materially bonded to the drill head, in particular to the cutting body. The basic body may be designed in such a way that the basic body does not intersect the longitudinal axis of the drilling tool in the transporting region. The basic body in particular at least partially, preferably entirely, bears axially against the drill head or against the cutting body. The basic body is designed in particular to transmit a percussive impulse from the handheld power tool to the drill head. The basic body consists of a metallic material, in particular a steel. The basic body is in particular rotationally fixedly coupled to the inserting end. The basic body may be formed in one piece with the inserting end.

The covering element is designed in particular to delimit the transporting channel on one or more sides radially along its extent. The covering element may have for example a curved form, in particular may be in the form of an arc of a circle, when viewed in cross section. As an alternative or in addition, the covering element may also have one or more planar surfaces which have a rectangular cross section. The covering element may consist of a metallic material or a plastic-containing material. If the covering element is made from a metallic material, the covering element may consist in particular of stainless steel, preferably C5CRNi18-10. This advantageously makes it possible for the covering element to have good resistance against abrasion and corrosion. If the covering element is made from a plastic-containing material, the covering element may consist of a thermoplastic material or thermosetting plastic, for example polyethylene, polypropylene, polyurethane, polyethylene terephthalate, polyamide, acrylonitrile-butadiene-styrene, polyether ether ketone, polytetrafluoroethylene, etc. Covering elements of plastic advantageously have especially high corrosion resistance, in particular with respect to salts. The covering element may be made from the same material as the basic body.

The gap of the covering element is provided for the purpose of assembling the covering element on the basic body. The gap advantageously allows lateral assembly of the covering element. The gap of the covering element extends in particular along the entire longitudinal extent of the covering element. The gap is arranged entirely outside an envelope curve of the basic body, with the result that the gap has an envelope curve with a larger diameter than the basic body. The angle range in which the gap is arranged or over which the size of the gap is defined is in particular in relation to a centre angle in which the longitudinal axis of the drilling tool forms the centre point.

It is proposed that the basic body has a core thickness and a width of the gap is the same as the core thickness or greater than the core thickness. This advantageously allows secure assembly. In the context of the present application, a core thickness is to be understood to mean a diameter of a core-thickness circle or a largest possible inner circle of the basic body that does not lie in the at least one transporting channel when viewed in cross section. In this respect, the width of the gap corresponds to the spacing between the two gap ends.

It is also proposed that the drilling tool has a single transporting channel. As an alternative, it is also conceivable that the drilling tool has two or more transporting channels. The transporting channels may extend in a straight line and/or parallel to the longitudinal axis or helically around the longitudinal axis.

In addition, it is proposed that the transporting channel is in the form of a concave groove in the basic body. Here, an inwardly directed curvature of the groove may have a substantially constant or varying form along the transporting channel. As an alternative, it is also conceivable that the transporting channel is in the form of a flat groove in the basic body. In this respect, the flat groove has a substantially planar groove base without a curvature. The flat groove may have a laterally open or closed form.

It is furthermore proposed that the drilling tool has at least two transporting channels, wherein the transporting channels transition into one another at a transition. The transition is preferably arranged in a region of the transporting region that faces the drill head. This advantageously makes it possible to ensure that the resulting drilling dust is completely collected. As an alternative, it is also conceivable that the transporting channels do not transition into one another and run spaced apart from one another.

It is also proposed that the drilling tool has a single covering element. As an alternative, it is also conceivable that the drilling tool has a further covering element, wherein the further covering element is arranged in the gap of the covering element. The covering elements preferably have the same size.

In addition, it is proposed that the basic body has a diameter which is smaller than a diameter of the inserting end. As an alternative, it is also conceivable that the diameter of the basic body is larger than the diameter of the inserting end.

It is also proposed that the connection element for connecting the drilling tool to a suction-extraction adapter is arranged between the transporting region and the inserting end. The connection element preferably has a rotationally symmetrical form, in particular is in the form of a peripheral groove or elevation.

In addition, it is proposed that the covering element and the basic body are materially bonded to one another. The material bond may be realized by a soldered connection or a welded connection, for example. As an alternative, it is also conceivable that the covering element and the basic body are connected to one another by a force fit and/or form fit, for example via a latching connection by means of a clip.

It is also proposed that the basic body has a polygonal cross section, in particular a triangular cross section or a hexagonal cross section.

The disclosure also relates in particular to a production method for a drilling tool which extends along a longitudinal axis, comprising a drill head, an inserting end, a basic body, a covering element and a transporting region, which is arranged between the drill head and the inserting end, and at least one transporting channel, which extends along the transporting region, wherein the transporting channel is arranged radially between the covering element and the basic body. It is proposed that the basic body is hardened and the basic body is soldered to the covering element in the same method step. This advantageously makes it possible to shorten the duration of the production method. In particular, both the hardening of the basic body and the soldering take place over substantially the same period of time in a hardening furnace.

The disclosure relates in particular to a suction-extraction adapter for a drilling tool, having a housing, wherein the housing has a suction-extraction device interface for the detachable connection of a suction-extraction device to the suction-extraction adapter, and having a tool connection unit for the axial fixing of the suction-extraction adapter on the drilling tool. It is proposed that the tool connection unit is designed in such a way that the tool connection unit can be connected to a first adapter element intended for small drilling tools, or alternatively to a second adapter element suitable for large drilling tools. This advantageously makes it possible to use the suction-extraction adapter with different drilling tools.

The housing and the suction-extraction device interface are formed in particular integrally or in one piece with one another. In the context of the present application, in one piece is to be understood to mean a component made from one piece and not from multiple components materially bonded and/or connected by a force fit and/or form fit to one another. Accordingly, a one-piece component consists of a single material. In the context of the present application, integrally is to be understood to mean in particular a component composed of multiple components materially bonded to one another. The housing is preferably made from a plastic, in particular from a hard plastic material.

The suction-extraction device may be in the form for example of a vacuum cleaner, in particular an industrial vacuum cleaner. It is likewise conceivable that the suction-extraction device is in the form of an accessory for a handheld power tool and can be connected detachably to the handheld power tool, in particular to a housing or handle of the handheld power tool. Dust extraction systems for handheld power tools may have a dedicated drive unit supplied with energy by the power tool or a handheld power tool battery pack. The suction-extraction device interface of the suction-extraction adapter is preferably in the form of a standard suction-extraction device interface, so that the suction-extraction device interface can be connected to different suction-extraction devices from different manufacturers.

In this context, a small drilling tool is to be understood to mean a drilling tool with a basic body which has a smaller diameter than the inserting end. In this context, a large drilling tool is to be understood to mean a drilling tool with a basic body which has a larger diameter than the inserting end.

The first and the second adapter element are formed detachably with the housing of the suction-extraction device. In the connected state, the adapter elements are preferably rotationally fixedly connected to the housing of the suction-extraction adapter.

It is also proposed that the tool connection unit has a connection body with a tool interface for detachable connection to the drilling tool and a housing interface for detachable connection to the housing of the suction-extraction adapter. In this context, a detachable connection is to be understood to mean a connection that can be detached without the use of tools. The tool interface and the housing interface are arranged in particular on different sides of the connection body. The tool interface is arranged on an internal side which faces the drilling tool. In addition, the tool interface and the housing interface are preferably arranged on different ends of the connection body. The housing interface and the tool interface preferably have rotationally symmetrical forms.

It is also proposed that the connection body in the region of the tool interface has an elastic form such that the tool interface can be spread open for the purpose of establishing a connection with the drilling tool. This advantageously allows simple assembly, during which the connection body snaps in in the final position. The tool interface in particular has an elastic form such that an inner diameter of the connection body in the region of the tool interface can be enlarged by hand by at least 5%, preferably by at least 10%, for example.

In addition, it is proposed that the suction-extraction adapter has at least one form-fitting element for the purpose of axial fixing, wherein the form-fitting element is made in particular from a metallic material. The form-fitting element corresponds in particular to the connection element of the drilling tool. The form-fitting element may have a spherical shape or a rod or pin shape, for example. The form-fitting element may be formed integrally or in one piece with the connection body. The form-fitting element may also be connected to the connection body by a force fit and/or form fit.

It is also proposed that the housing interface has an external peripheral groove corresponding to a locking mechanism of the housing. This advantageously makes it possible to connect the tool connection unit detachably to the housing. The groove of the housing interface is arranged in particular in the connection body.

It is also proposed that the connection body has an adapter opening, in which the first adapter element or alternatively the second adapter element can be received. This advantageously makes it possible to connect the same connection body to different adapter elements. The adapter opening has at least one adapter connection element designed for the force-fitting and/or form-fitting connection of the connection body to at least one of the adapter elements.

In addition, it is proposed that the connection body is connected to the first adapter element by a force fit and/or form fit, in particular detachably. This advantageously makes it possible to connect the connection body to different first adapter elements.

It is also proposed that the first adapter element has a diaphragm element which partially conceals the adapter opening in the connected state. The diaphragm element may have an adjustable form, in particular be in the form of an iris diaphragm, or a non-adjustable form. In particular, the first adapter element has a drilling tool leadthrough which is arranged coaxially to the adapter opening and has a smaller diameter than the adapter opening. The drilling tool leadthrough has in particular a diameter which is larger than a drill head diameter and smaller than the diameter of the inserting end.

In addition, it is proposed that the second adapter element has a sleeve element, which is designed to cover a transporting channel of the drilling tool. In this case, the sleeve element corresponds substantially to a covering element having a circular cross section without a gap. The sleeve element may be made from the same materials as the covering element described above.

The sleeve element has a length which corresponds substantially to the length of the transporting region of the drilling tool.

It is also proposed that the second adapter element, in particular the sleeve element, is materially bonded to the connection body. In particular, the sleeve element is materially bonded to the connection body via a size equalization ring. This advantageously makes it possible to realize a stable material bond.

The disclosure furthermore relates in particular to a system comprising a small drilling tool having a suction-extraction adapter with a first adapter element and comprising a large drilling tool having a suction-extraction adapter with a second adapter element. It is proposed that the suction-extraction adapters differ only in terms of the adapter element. This advantageously makes it possible to provide a system that can be used flexibly.

The disclosure relates to a suction-extraction adapter for a drilling tool, having a housing, wherein the housing has a suction-extraction device interface for the detachable connection of a suction-extraction device to the suction-extraction adapter, and having a tool connection unit for the axial fixing of the suction-extraction adapter on the drilling tool. It is proposed that the housing has a locking mechanism, wherein the tool connection unit can be locked on the housing of the suction-extraction adapter via the locking mechanism. This advantageously makes it possible to realize a detachable and secure connection of the tool connection unit to the housing of the suction-extraction adapter. The locking mechanism in particular is manually actuable and detachable without tools.

It is also proposed that the locking mechanism has an actuating element to which a force is applied by a restoring element. The actuating element may be actuable via a translational movement and/or a rotational movement, for example. The actuating element may be in the form of a knob, a button, a lever or the like, for example. The actuating element is connected movably to the housing of the suction-extraction adapter.

It is also proposed that the actuating element is in the form of an actuating sleeve. The actuating element is preferably formed integrally or in one piece. In particular, the actuating element is mounted so as to be able to move linearly relative to a main body of the housing. In this respect, the actuating sleeve encloses the main body completely at least in certain regions.

In addition, it is proposed that the suction-extraction device interface is in the form of a suction-extraction nozzle. This advantageously makes it possible to connect the suction-extraction device interface to different suction-extraction devices. The suction-extraction nozzle is designed for force-fitting and/or form-fitting connection to the suction-extraction device, in particular a suction hose of the suction-extraction device.

It is also proposed that the actuating element is arranged in such a way that the suction-extraction device interface, in particular the suction-extraction nozzle, is designed such that it can be gripped by the user for the purpose of assisting the actuating movement. This advantageously makes it possible to provide an ergonomic suction-extraction adapter. The suction-extraction adapter is designed in particular in such a way that the actuating movement of the actuating element is arranged so as to intersect, in particular substantially perpendicularly, a connection direction of the suction-extraction device interface by way of which the suction-extraction device interface is connected to the suction-extraction device.

It is also proposed that the locking mechanism has at least one, in particular at least two, preferably at least three latching elements. The latching elements are in particular in the form of latching balls. The latching elements are arranged movably in the housing of the suction-extraction adapter. The latching elements may consist of a metallic material or plastic.

The disclosure further relates to a drilling tool with a suction-extraction adapter as described above.

The disclosure further relates to a system having a drilling tool with a suction-extraction adapter as described above and a handheld power tool with a tool receptacle, wherein the tool receptacle has a locking mechanism which substantially corresponds to the locking mechanism of the suction-extraction adapter. This advantageously makes it possible for the user to use the suction-extraction adapter intuitively.

It is also proposed that the locking mechanism of the suction-extraction adapter and the locking mechanism of the handheld power tool have substantially the same direction of actuation and the respective locking is carried out via latching balls.

BRIEF DESCRIPTION OF THE DRAWINGS

Further advantages will become apparent from the following description of the drawing. The drawings, the description and the claims contain numerous features in combination. A person skilled in the art will expediently also consider the features individually and combine them to form useful further combinations. Reference signs of substantially corresponding features of different embodiments of the disclosure are provided with the same number and with a letter characterizing the embodiment.

FIG. 1a shows a side view of a system consisting of a handheld power tool with a drilling tool which is connected to a suction-extraction device via a suction-extraction adapter;

FIG. 1l shows an exploded view of a tool connection unit of the suction-extraction adapter for the drilling tool according to FIG. 1j;

FIG. 2-15a show alternative embodiments of a drilling tool with at least one covering element in cross section;

FIG. 15b shows a perspective view of a basic body of the drilling tool according to FIG. 15a;

DETAILED DESCRIPTION

Figure 1B:
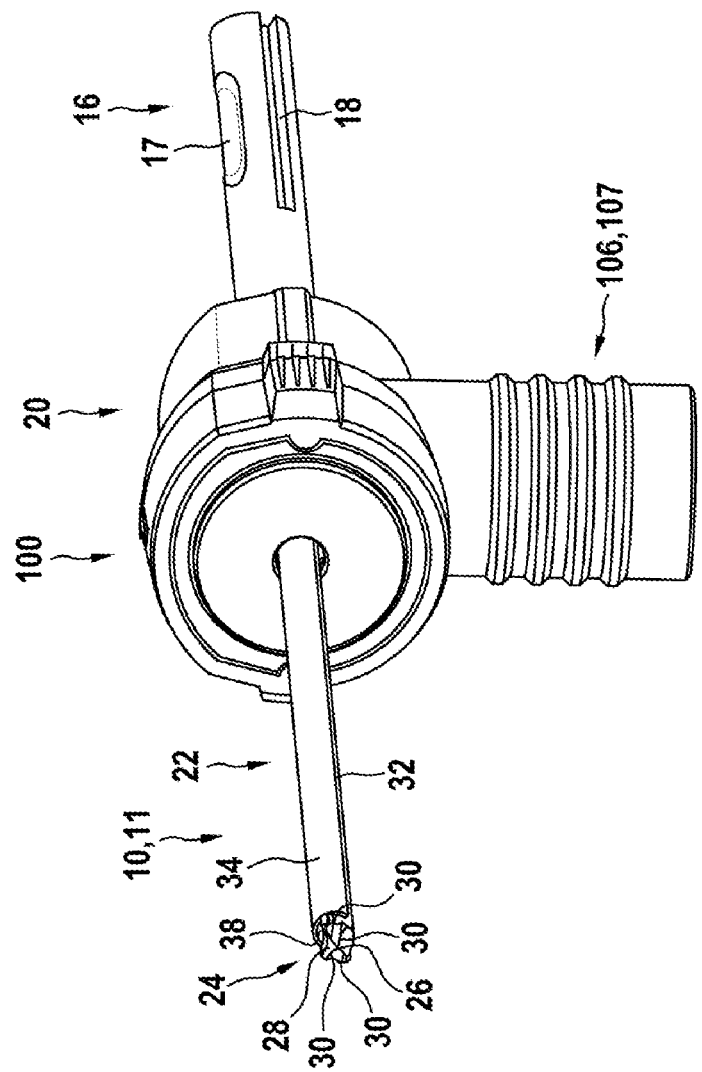
FIG. 1b shows a perspective view of a drilling tool with a suction-extraction adapter.

FIG. 1a shows a schematic view of a tool system. The tool system comprises a drilling tool 10, a handheld power tool 300 and a suction-extraction device 400. By way of example, the handheld power tool 300 is in the form of a hammer drill. The handheld power tool 300 has a tool receptacle 302, which is designed to receive an insert tool in the form of a drilling tool 10. The handheld power tool 300 has a drive unit (not illustrated), which comprises an electric motor, and a transmission comprising a pneumatic impact mechanism. The drilling tool 10 in the coupled state can be driven in rotation about a longitudinal axis 12 of the drilling tool 10 and in linear oscillation or percussively along the longitudinal axis 12 by the drive unit and the transmission.

Figure 1C:
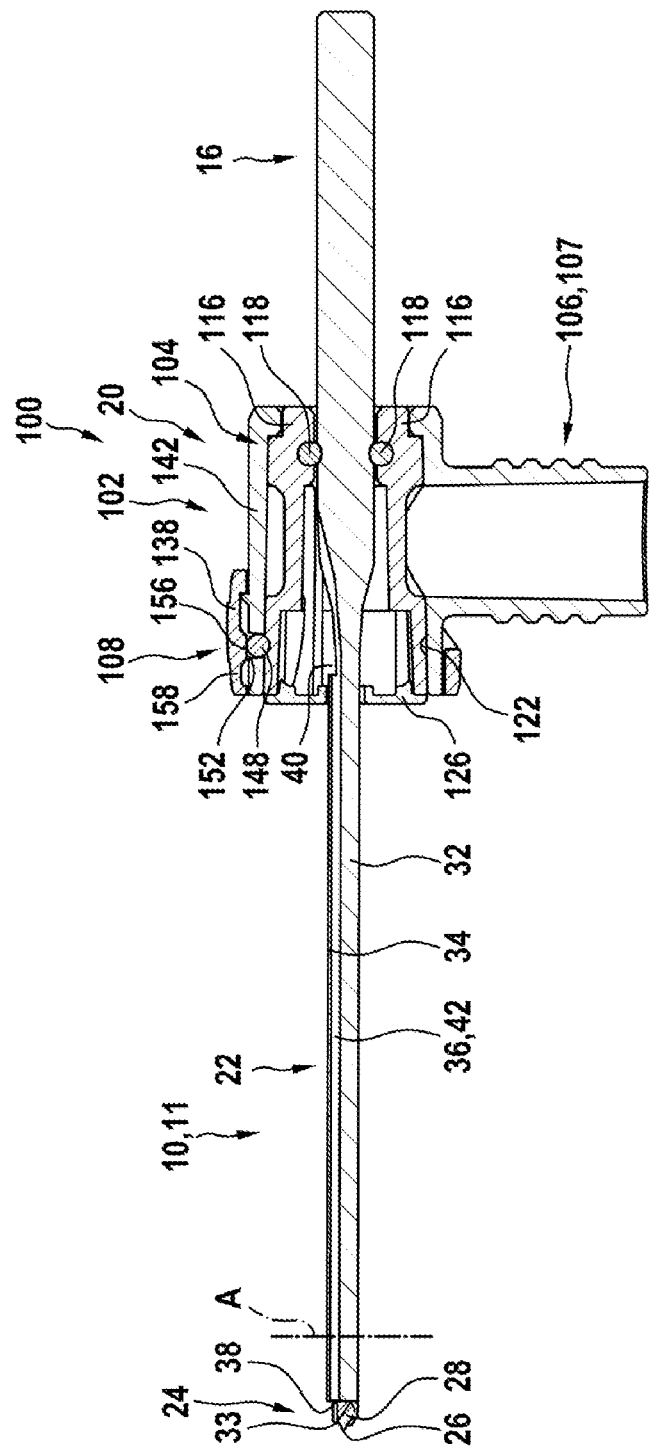
FIG. 1c shows a longitudinal section of the drilling tool with the suction-extraction adapter.

The drilling tool 10 is in the form of a rock drill and is shown in an enlarged perspective illustration in FIG. 1b. The drilling tool 10 is in particular in the form of a suction drill, by way of which dust and drilling cuttings can be extracted by suction during the drilling operation within the drilled hole. In addition, the drilling tool 10 in FIG. 1c is shown in a longitudinal section. The drilling tool 10 is in particular provided to create a drilled hole in a workpiece 14, which by way of example is in the form of masonry. The drilled hole is created via a percussive movement of the drilling tool 10 along the longitudinal axis 12 and a rotational movement of the drilling tool 10 about the longitudinal axis 12. The drilling tool 10 has an inserting end 16, which is designed for coupling the drilling tool 10 to the handheld power tool 300. By way of example, the inserting end 16 of the drilling tool 10 has a larger diameter than the drill head 24. The drilling tool 10 is thus in the form of a small drilling tool 11.

By way of example, the inserting end 16 is in the form of an SDS-plus interface. The inserting end 16 has two first form-fitting elements 17 and two second form-fitting elements 18 for connection to the tool receptacle 302 of the handheld power tool 300. The first form-fitting elements 17 are in the form of axially closed grooves, into which, in the connected state, latching elements (not illustrated) of the tool receptacle 302 that are in the form of latching balls engage for the purpose of axially fixing the drilling tool 10 in the handheld power tool 300. The connection is detachable by way of an actuating sleeve (not illustrated) of the tool receptacle 302, the actuating movement necessary for detaching the connection being effected along the longitudinal axis 12 of the drilling tool 10 and in the opposite direction to the advancing direction. The second form-fitting elements 18 are in the form of open grooves provided for guidance purposes.

Proceeding from the inserting end 16, along its longitudinal extent the drilling tool 10 has a connection region 20 for connecting the drilling tool 10 to a suction-extraction adapter 100, a transporting region 22 and a drill head 24. The front end of the drilling tool 10 is formed by the drill head 24 and the rear end of the drilling tool 10 is formed by the inserting end 16.

The suction-extraction adapter 100 is connected to the suction-extraction device 400, which by way of example is in the form of an industrial vacuum cleaner, via a suction hose 402.

The suction-extraction adapter 100 has a multi-part form and has a housing 102 and a tool connection unit 104 for the axial fixing of the suction-extraction adapter 100 on the drilling tool 10. The housing 102 comprises a suction-extraction device interface 106 for detachable connection to the suction-extraction device 400. By way of example, the suction-extraction device interface 106 is in the form of a suction-extraction nozzle 107. By way of example, the suction-extraction nozzle 107 has a conical inner side for connection to the suction hose 402. The housing 102 and the tool connection unit 104 are connected to one another via a locking mechanism 108 so as to be detachable without the use of tools. The suction-extraction adapter 100 and the drilling tool 10 are connected so as to be able to rotate relative to one another.

The drill head 24 has a single cutting body 28 in the form of a solid hard metal head. The cutting body 28 is placed on a blunt end face 33 of a basic body 32 of the drilling tool 10 and welded to it. By way of example, the cutting body 28 comprises four cutting elements 30, in particular two main cutting elements and two auxiliary cutting elements. The cutting body 28 is formed in one piece. The drill head 24 has a tip 26 which is in the form of a centring tip and projects on the end face in such a way that it comes into contact with the workpiece 14 first. In the transporting region 22, the drilling tool 10 has a basic body 32 and a covering element 34. A transporting channel 36 for transporting away drilling cuttings from the drilled hole is arranged radially between the basic body 32 and the covering element 34. The covering element 34 is connected immovably and rotationally fixedly to the basic body 32. The covering element 34 is arranged entirely outside the basic body 32.

The transporting channel 36 extends along the longitudinal axis 12 completely through the transporting region 22. The transporting channel 36 has a suction opening 38, via which drilling cuttings enter the transporting channel 36 during the creation of the drilled hole, and a suction-extraction opening 40, via which the drilled cuttings leave the transporting channel 36. The suction-extraction opening 40 is arranged within the suction-extraction adapter 100 in this case. By way of example, the drilling tool 10 has a single transporting channel 36. However, it would likewise be conceivable that the drilling tool 10 has multiple transporting channels.

Figure 1D:
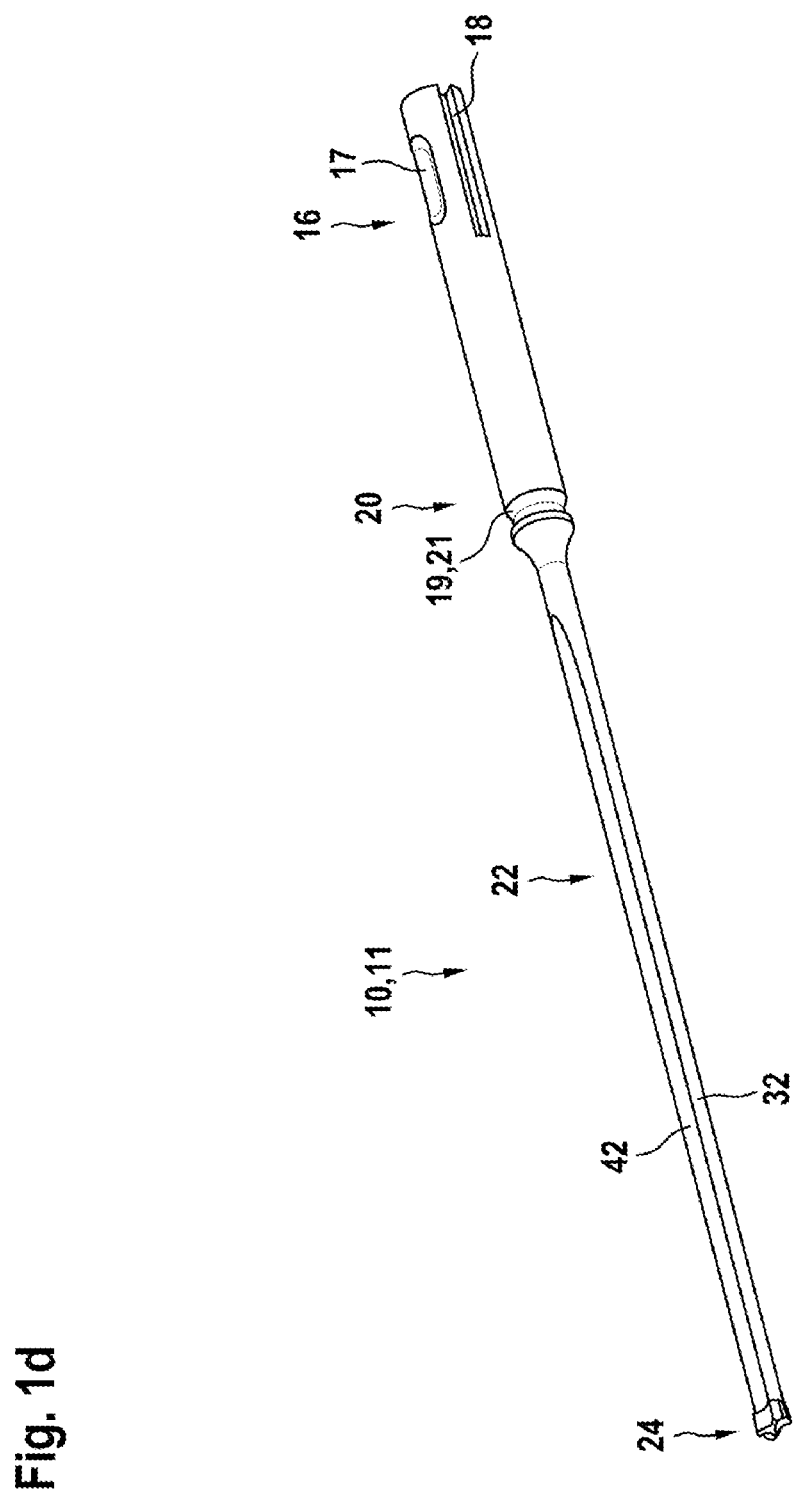
FIG. 1d shows a perspective view of the drilling tool without covering element.

FIG. 1*d* shows the drilling tool 10 without the covering element 34 in a perspective view. The basic body 32 of the drilling tool 10 has an external groove 42 which extends through the transporting region 22 in a straight line and parallel to the longitudinal axis 12. As an alternative, it would likewise be conceivable that the single external groove 42 extends through the transporting region 22 helically around the longitudinal axis 12. The groove 42 is axially open at its end facing the drill head 24; at its end facing away from the drill head 24, the groove 42 is axially closed and radially outwardly open.

The connection region 20 between the transporting region 22 and the inserting end 16 has a connection element 19 designed to connect the drilling tool 10, in particular the basic body 32 of the drilling tool 10, to the suction-extraction adapter 100. By way of example, the connection element 19 has a rotationally symmetrical form. By way of example, the connection element 19 is in the form of a peripheral groove 21. The connection region 20 has a diameter which substantially corresponds to the diameter of the inserting end 16. In this respect, the connection region 20 also has a larger diameter in the groove base of the connection element 19 than the transporting region 22 in the region of the transporting channel 36.

Figure 1F:
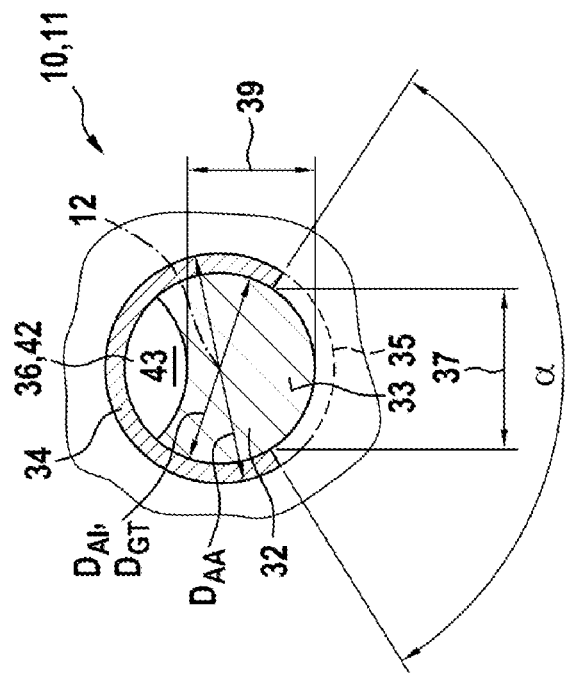
FIG. 1f shows a cross section through the drilling tool according to FIG. 1b.
Figure 1E:
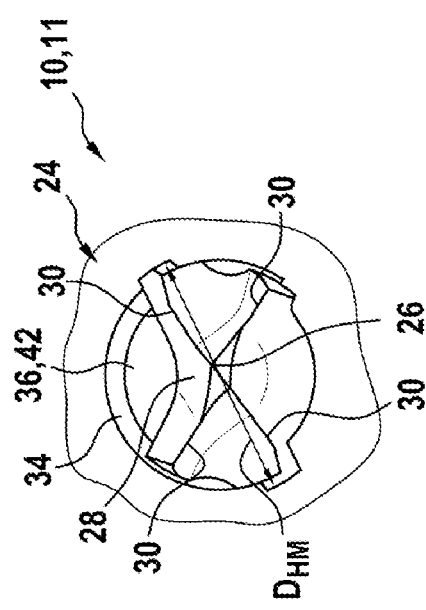
FIG. 1e shows a plan view of the drilling tool according to FIG. 1b.

FIG. 1*e* shows the drilling tool 10 in a plan view. FIG. 1*f* shows a cross section A (see FIG. 1*c*) through the drilling tool 10. By way of example, the covering element 34 is in the form of an arc of a circle.

By way of example, the groove 42 in the basic body 32 is in the form of a concave groove. The groove 42 is terminated radially in the transporting region 22 by the covering element 34 in such a way that the transporting channel 36 is circumferentially closed in the transporting region 22.

The cutting body 28 is shaped in such a way that a joining surface of the cutting body 28 corresponds to the blunt end face 33 of the basic body 32 against which the cutting body 28 bears. The cutting body 28 has a diameter $D_{HM}$, which corresponds substantially to the resulting size of the drilled hole.

The basic body 32 has a diameter $D_{GT}$ in the transporting region 22. In this respect, the diameter $D_{HM}$ of the drill head 24 is larger than the diameter $D_{GT}$ of the basic body 32. The covering element 34 is arranged entirely outside the basic body 32 and has a gap 35.

The covering element 34 has an inner diameter $D_{AI}$ and an outer diameter $D_{AA}$. The difference between the outer diameter $D_{AA}$ and the inner diameter $D_{AI}$ corresponds to a thickness of the covering element 34 here. The inner diameter $D_{AI}$ corresponds substantially to the diameter $D_{GT}$ of the basic body 32. The thickness of the covering element 34 is designed in such a way that the outer diameter $D_{AA}$ of the covering element 34 is smaller than the diameter $D_{HM}$ of the drill head 24. This advantageously forms an air feed gap. In particular, the thickness of the covering element 34 corresponds to at least 50%, preferably at least 75%, preferentially at least 90%, of the difference between the diameter $D_{HM}$ of the drill head 24 and the diameter $D_{GT}$ of the basic body 32 in the transporting region 22.

The covering element 34 is circumferentially open owing to the gap 35. The covering element 34 is connected fixedly to the basic body 32, by way of example by a material bond in the form of a soldered connection. The covering element 34 is shaped in such a way that a cross-sectional area 43 of the transporting channel 36 has a substantially constant form in the transporting region 22. In other words, the profile of the transporting channel 36 has a substantially straight camber line. In particular, the camber line is substantially straight substantially along the entire transporting channel 36, preferably between the suction opening 38 and the suction-extraction opening 40.

The gap 35 enables the covering element 34 to be assembled on the basic body 32 after the basic body has been connected to the cutting body 28.

When viewed in cross section, the gap 35 takes up an angle range of approx. 110°, wherein the angle range is in relation to a centre angle $\alpha$. The reference point for the centre angle $\alpha$ is the longitudinal axis 12. In addition, the gap 35 has a width 37 which is larger than a core thickness 39 of the basic body 32 in the transporting region 22. By way of example, the core thickness 39 has a substantially constant form. However, it is also conceivable that the core thickness changes along the longitudinal axis 12.

Figure 1G:
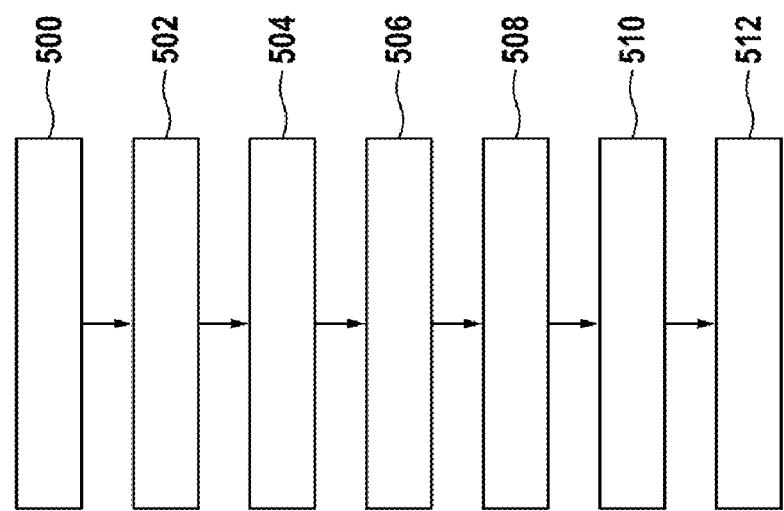
FIG. 1g shows a flow diagram of a production method for the drilling tool according to FIG. 1b.

FIG. 1g illustrates a flow diagram of a production method for the small drilling tool 11 as described above.

In a first method step 500, the basic body 32 with the inserting end 16 is provided from a metal blank, in particular a steel blank.

In a second method step 502, the transporting region 22 is produced by milling a straight groove 42 in the basic body 32.

In a third method step 504, the connection element 19 in the form of the peripheral groove 21, and thus the connection region 20, is produced by means of a turning method.

In a fourth method step 506, the cutting body 28 in the form of a solid hard metal head is welded to the basic body on the blunt end face 33 of the basic body 32.

In a fifth method step 508, the covering element 34 is assembled laterally on the basic body 32 in the transporting region 22 for the purpose of covering the transporting channel 36.

In the sixth method step 510, a solder film or a solder paste is placed in the transition region between the basic body 32 and the covering element 34.

In a seventh method step 512, in a hardening furnace the drilling tool 10 is hardened and also the covering element 34 is soldered on the basic body 32.

The drilling tool 10 is connected to the suction-extraction adapter 100 via a two-stage process.

Figure 1H:
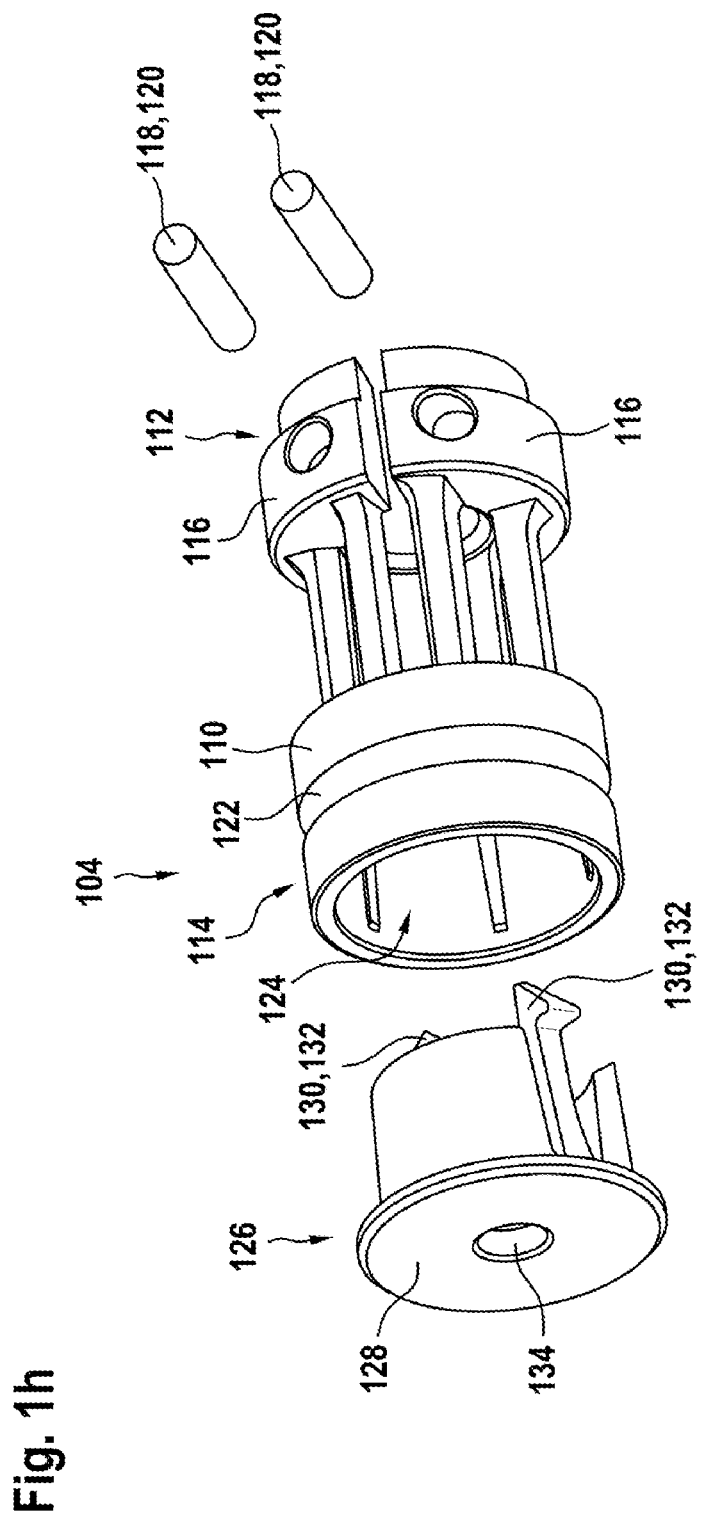
FIG. 1h shows an exploded view of a tool connection unit of the suction-extraction adapter according to FIG. 1b.

In a first assembly method step, the drilling tool 10 is connected to the tool connection unit 104 of the suction-extraction adapter 100. The tool connection unit 104 is shown in FIG. 1h in a perspective exploded view.

The tool connection unit 104 has a connection body 110. The connection body 110 comprises a tool interface 112 for detachable connection to the drilling tool 10 and a housing interface 114 for detachable connection to the housing 102 of the suction-extraction adapter 100. By way of example, the connection body 110 is formed in one piece and made from a plastic, in particular a hard plastic material.

The tool interface 112 and the housing interface 114 are arranged at different ends of the connection body 110 when viewed along the longitudinal axis 12 of the drilling tool 10. In the region of the tool interface 112, the connection body 110 has a flexible form and, in the region of the housing interface 114, it has a substantially rigid form. In this context, flexible as opposed to rigid is to be understood to mean that a diameter of the connection body 110 in the region of the tool interface 112 can be enlarged or reduced as a result of pressure exerted by a user. In the region of the housing interface 114, this is not possible.

By way of example, the tool interface 112 consists of two arms 116, which can be moved relative to one another and are connected to one another via the housing interface 114. In addition, the tool interface 112 has two form-fitting elements 118 for the purpose of axial fixing. By way of example, the form-fitting elements 118 are in the form of metallic pins 120 engaging in corresponding cylindrical bores in the connection body 110. By way of example, the tool interface 112 has one form-fitting element 118 per arm 116. The form-fitting elements 118 are arranged in such a way that, in the state connected to the drilling tool 10, they engage into the connection element 19 of the basic body 32 by way of a form fit and thus axially fix the connection body such that it can rotate.

The housing interface 114 has an external peripheral groove 122. In addition, in the region of the housing interface 114 the connection body 110 has an adapter opening 124 for connection to a first adapter element 126.

By way of example, the first adapter element 126 is formed in one piece and made from a hard plastic material. The first adapter element 126 comprises a diaphragm element 128 and two latching elements 130. By way of example, the latching elements 130 are in the form of latching hooks 132 and are provided for the purpose of connecting the adapter element 126 to the connection body 110 by a force fit and form fit. By way of example, the connection is effected rotationally fixedly here.

The diaphragm element 128 is designed to cover the adapter opening 124 in the connected state. In this case, the diaphragm element 128 covers the adapter opening 124 substantially completely except for a drilling tool leadthrough 134. The drilling tool leadthrough 134 is arranged in the diaphragm element 128 of the first adapter element 126. The drilling tool leadthrough 134 is adapted to the size of the drill head 24 of the drilling tool here.

For assembly purposes, the arms 116 of the tool interface 112 are spread open and then the tool connection unit 104 with the tool interface 112 at the front is pushed onto the drilling tool 10 over the drill head 24. If the tool interface 112 is arranged in the region of the connection element 19, the form-fitting elements 118 latch into the connection element 19 of the basic body 32.

Figure 1I:
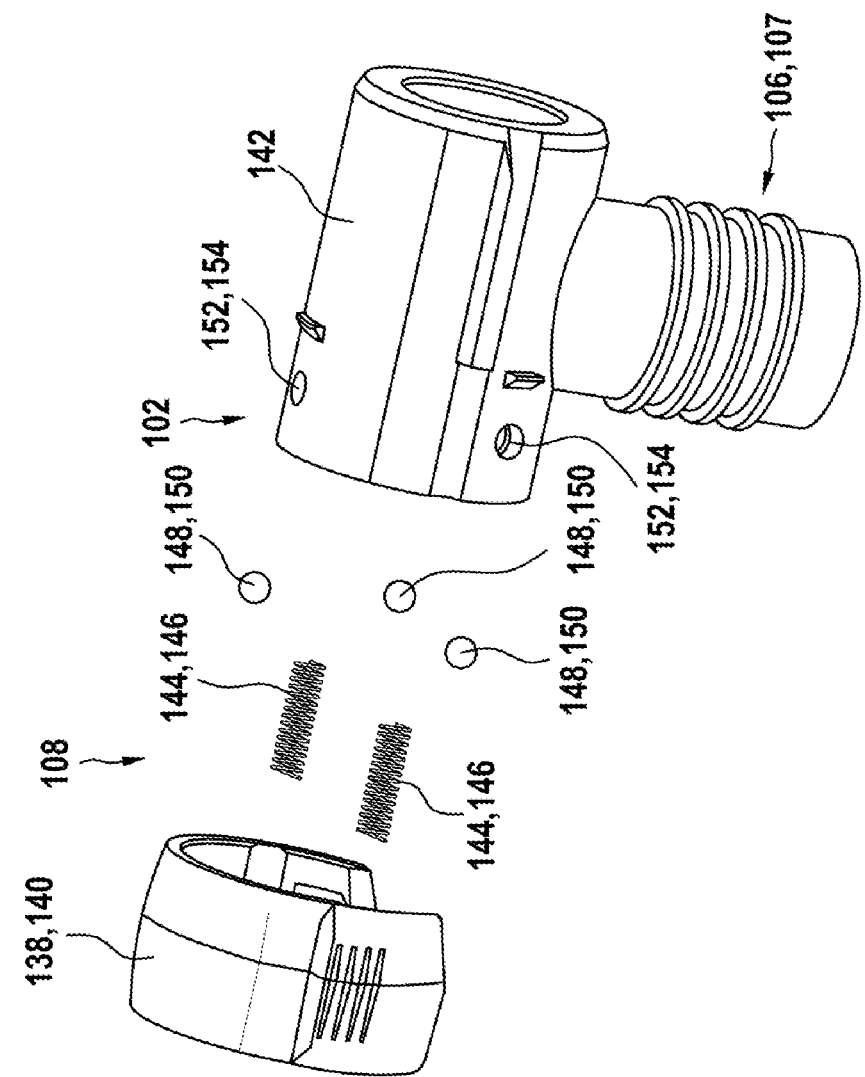
FIG. 1i shows an exploded view of a housing of the suction-extraction adapter according to FIG. 1b.

In a second assembly method step, the housing 102 of the suction-extraction adapter 100 is assembled. FIG. 1i shows the housing 102 of the suction-extraction adapter 100 in a perspective exploded view.

The housing 102 of the suction-extraction adapter 100 is assembled with the tool connection unit 104 via actuation of the locking mechanism 108. In the assembled state, the locking mechanism 108 encloses the tool connection unit 104 and the drilling tool 10.

The locking mechanism 108 comprises an actuating element 138 in the form of an actuating sleeve 140. The actuating element 138 is connected to a main body 142 of the housing 102 of the suction-extraction adapter 100 so as to be able to move linearly. By way of example, the actuating element 138 and the main body 142 are formed in one piece and are made from a hard plastic material, in particular the same plastic.

By way of example, the actuating element 138 is subjected to a force by means of two restoring elements 144 in its locking position. By way of example, the restoring elements 144 are in the form of helical springs 146.

In addition, by way of example, the locking mechanism 108 comprises three locking elements 148. By way of example, the locking elements 148 are in the form of latching balls 150. By way of example, the latching balls 150 are made from a metal.

The main body 142 of the housing 102 comprises the suction-extraction device interface 106 in the form of the suction-extraction nozzle 107. In addition, the main body 142 comprises one locking element receptacle 152 per locking element 148. By way of example, the locking element receptacles 152 are in the form of conical bores 154, which have a smaller opening on a side facing the drilling tool 10. The locking elements 148 are inserted into the locking element receptacles 152 from the outside and held between the main body 142 and the actuating element 138.

On its inner side, the actuating element 138 has holding elements 156 and releasing elements 158 (see FIG. 1c), which are arranged one behind the other along the longitudinal axis 12 of the drilling tool 10. By way of example, the actuating element 138 is formed in one piece and the holding elements 156 and the releasing elements 158 are moulded on the actuating element 138.

The holding element 156 is in the form of a diameter reduction and, in the locked state, is arranged over the locking elements 148. In the assembled and locked state, the locking elements 148 are held by means of the holding element 156 in the locking element receptacles 152 in such a way that the locking elements 148 are arranged partially in the interior space of the main body 142 and engage into the peripheral groove 122 of the housing interface 114 of the tool connection unit 104. This therefore rotatably fixes the housing 102 on the tool connection element 104.

The releasing element 158 is in the form of a diameter widening in relation to the holding element 156. The actuating element 138 is actuated by way of a relative movement of the actuating element 138 in the opposite direction to the advancing direction of the drilling tool 10. In the unlocked state, the releasing element 158 is arranged over the locking elements 148, which have a larger space in which to move as a result and can leave the peripheral groove 122 of the tool connection unit 104.

In the region of the housing interface 114 of the tool connection unit 104, the housing 102, in particular the main body 142 of the housing 102, is shaped in such a way that the housing interface 114 cannot be detached from the drilling tool 10 or cannot be spread open in the assembled state. This advantageously ensures that the suction-extraction adapter 100 cannot detach from the drilling tool 10 in the locked state.

The housing 102 of the suction-extraction adapter 100 is connected to the drilling tool 10 here by means of sliding the housing 102 on over the inserting end 16 of the drilling tool 10.

Figure 1J:
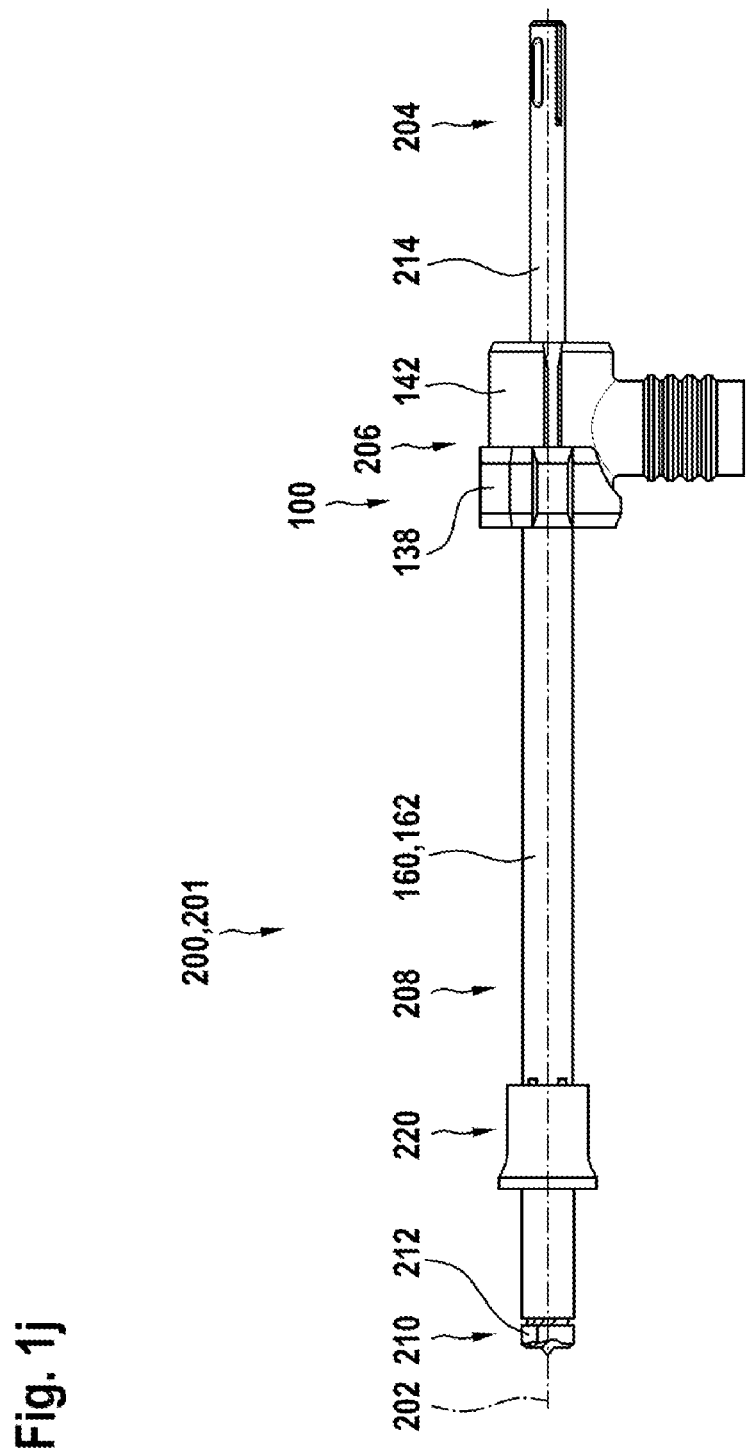
FIG. 1j shows a perspective view of a large drilling tool with the suction-extraction adapter.

FIG. 1j shows the suction-extraction adapter 100 in the state connected to a further drilling tool 200, in particular a large drilling tool 201, in a side view.

The drilling tool 200 is likewise in the form of a suction drill and, along its longitudinal extent 202, comprises an inserting end 204, a connection region 206, a transporting region 208 and a drill head 210.

By contrast to the small drilling tool 11, the transporting region 208 of the large drilling tool 201 has a larger diameter than the inserting end 204. The inserting end 204 is in the form of an SDS-plus inserting end, as already described above.

The drill head 210 has a cutting body 212 in the form of a solid hard metal head, which by way of example is welded to a basic body 214 of the drilling tool 200 as described above.

The drilling tool 200, in particular the basic body 214 of the drilling tool 200, has eccentric grooves 216 (see FIG. 1k) in the transporting region 208, which are radially outwardly closed by a second adapter element 160, in particular a sleeve element 162. By contrast to the covering element 34 of the small drilling tool 11, the sleeve element 162 does not have a gap 35 and therefore has a circumferentially closed form. The sleeve element 162 is rotationally fixedly connected to the suction-extraction adapter 100, the drilling tool 200 rotating within the sleeve element 162 during operation. The sleeve element 162 has a wall thickness of between 0.5 mm and 1.0 mm. A two-component, in particular low-viscosity, adhesive on the basis of epoxy resin is used to materially bond the sleeve element 162. The transporting channels 218 of the large drilling tool 201 are formed radially in the grooves 216 between the basic body 214 and the sleeve element 162.

A drill crown 220, which is connected to the sleeve element 162 so as to be able to move linearly, is fitted on the sleeve element 162.

Figure 1K:
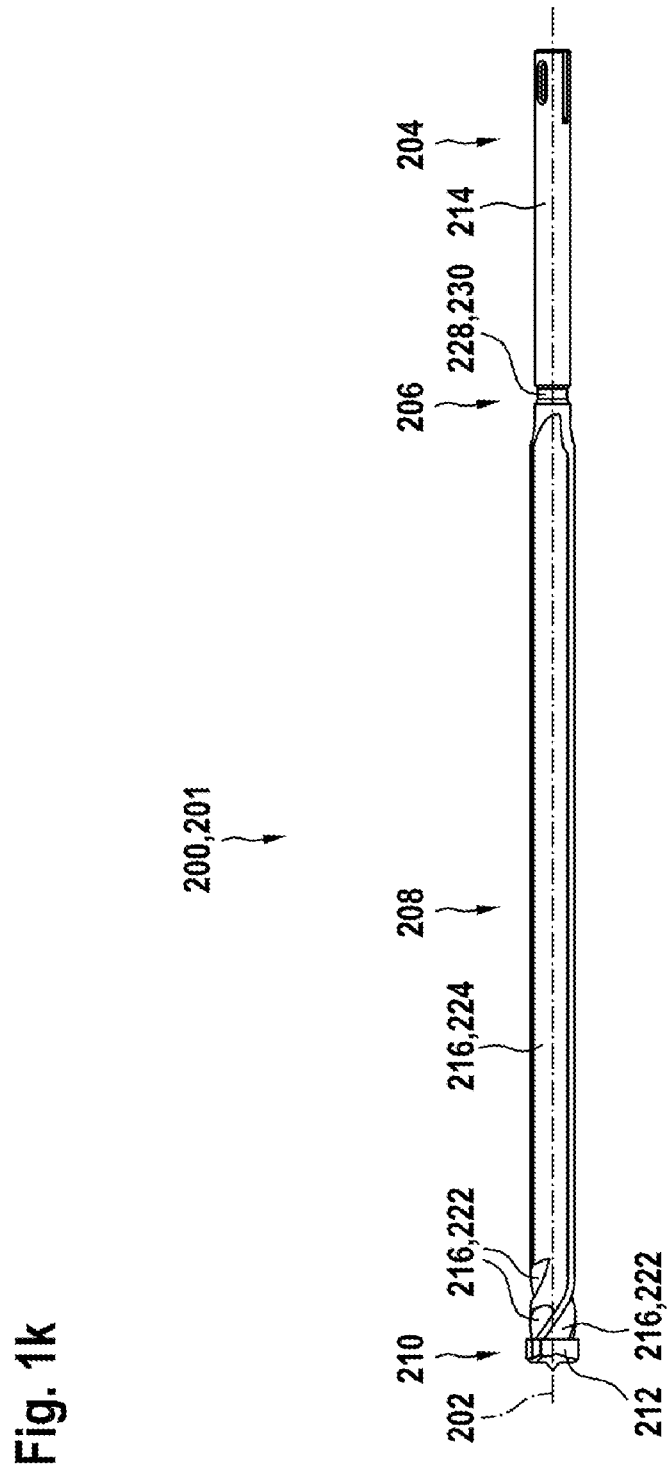
FIG. 1k shows a side view of the drilling tool according to FIG. 1j.

FIG. 1k shows the drilling tool 200 in a state in which it is not connected to the suction-extraction adapter 100.

The basic body 214 of the drilling tool 200 is formed in one piece. In a region facing the drill head 210, by way of example the basic body 214 has four concave grooves 222 extending helically around the longitudinal axis 202. In this respect, the concave grooves 222 are formed in such a way that they wind around the longitudinal axis 202 at least over ⅛ of a turn, preferably over at least ½ of a turn, preferentially over at least a full turn. By way of example, the concave grooves 222 extend substantially uniformly spaced apart from one another. Along the longitudinal axis 202, the concave grooves 222 have a length which corresponds at least to a length of the drill head 210 and is less than three times the length of the drill head 210.

In addition, the basic body 214 has two substantially flat grooves 224, which are arranged partially behind the concave grooves 222. The flat grooves 224 are arranged on opposite sides of the basic body 214. The concave grooves 222 transition into the flat grooves 224, with the result that two grooves 216 are formed from four grooves 216. The flat grooves 224 extend in a straight line and substantially parallel to the longitudinal axis 202 of the drilling tool 200. Therefore, the pitch of the grooves 216 falls in particular to zero owing to the transition to the flat grooves 224. However, it would likewise be conceivable that the concave grooves 222 do not extend helically around the longitudinal axis 202 and/or the flat grooves 224 extend helically around the longitudinal axis 202.

Between the transporting region 208 and the inserting end 204, the basic body 214 in the connection region 206 has a connection element 228 in the form of an external peripheral groove 230. The connection element 228 corresponds substantially to the connection element 19 of the basic body 32 of the small drilling tool 11. This advantageously makes it possible to connect the suction-extraction adapter 100, in particular the tool connection unit 104 of the suction-extraction adapter 100, both to the small drilling tool 11 and to the large drilling tool 201.

FIG. 1l shows the tool connection unit 104 and the second adapter element 160 in a perspective exploded view.

The first adapter element 126 and the second adapter element 160 have substantially the same connection body 110 with the same housing interface 114 and the same tool interface 112.

The second adapter element 160 is received or connected via the adapter opening 124 in the same way as the first adapter element 126. The connection is effected here by inserting a size equalization ring 164, which is adapted to the size of the sleeve element 162. The size equalization ring 164 has an inner diameter corresponding substantially to an outer diameter of the sleeve element 162. In addition, the size equalization ring 164 has an outer diameter corresponding substantially to an inner diameter of the connection body 110 in the region of the adapter opening 124.

After the size equalization ring 164 has been inserted, the sleeve element 162 is materially bonded to it by means of an adhesive 166 in a rotationally fixed manner.

For connection to the drilling tool 200, the tool connection unit 104 with the second adapter unit 160 at the front is pushed over the inserting end 204 onto the basic body 214 of the drilling tool 200 until the form-fitting elements of the tool connection unit 104 latch into the connection element 228 of the basic body 214.

After this, the housing 102 of the suction-extraction adapter 100 can be connected to the tool connection unit 104 as described above. Consequently, both the large drilling tool 201 and the small drilling tool 11 are rotatably connected to the suction-extraction adapter 100.

Figure 1M:
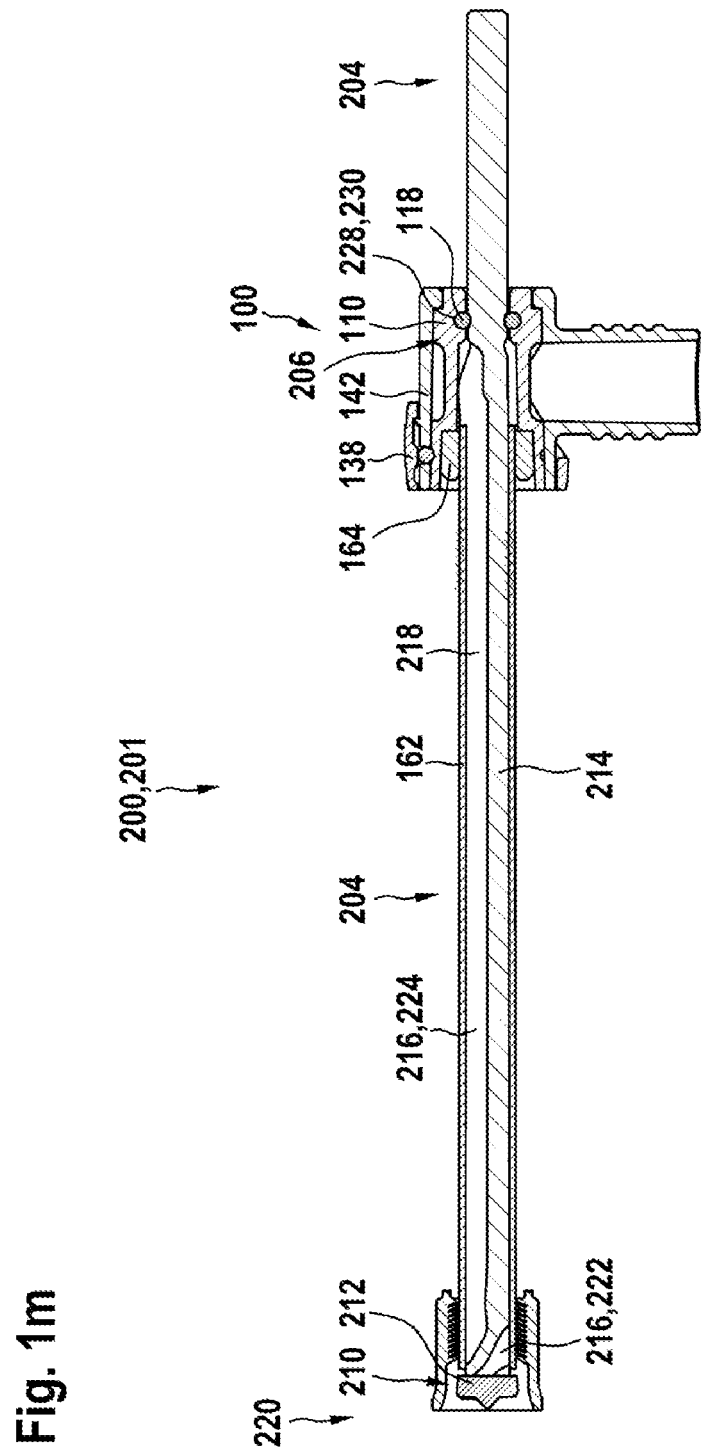
FIG. 1m shows a longitudinal section of the drilling tool according to FIG. 1j with the suction-extraction adapter.

FIG. 1m shows a longitudinal section through the suction-extraction adapter 100 in the state connected to the large drilling tool 201.

Figure 1N:
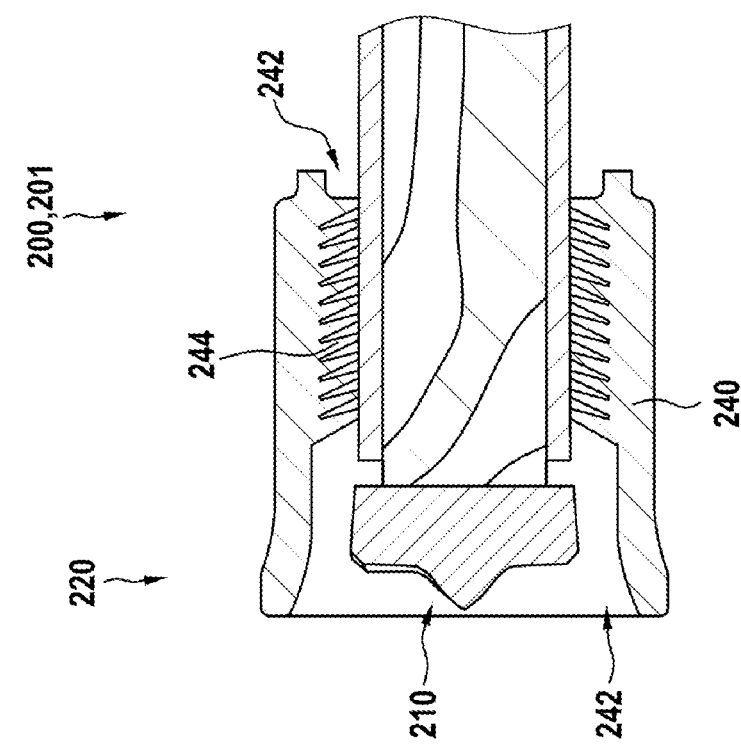
FIG. 1n shows a longitudinal section through a drill crown in the state connected to the drilling tool according to FIG. 1j.

FIG. 1n shows a longitudinal section through the drill head 210 and the drill crown 220. The drill crown 220 is in particular designed to close off the region around the drill head 210 during spot drilling, and in this way the accrued drilling dust and drilling cuttings can be effectively extracted by the drilling tool 200 by suction during spot drilling.

The drill crown 220 has a substantially cylindrical basic body 240 with two oppositely situated openings 242, through which the drilling tool 200 can be guided. On the inner side of the basic body 240, the drill crown 220 has guide elements 244 which are designed in such a way that the drill crown 220 can be moved more easily in the one direction than in the other direction in the state connected to the drilling tool 200. In particular, the guide elements 244 are designed in such a way that the forwards movement in the direction of the drill head 210 is made easier and the backwards movement is made more difficult.

The guide elements 244 are formed by a multiplicity of ribs which are arranged parallel to one another and extend at an angle in the direction of the drilling tool 200. In this respect, the angle is of the ribs is in a range of between 45° and 90° and the ribs extend in a direction away from the drill head 210. By way of example, the drill crown 220 is formed in one piece and made from a plastic, in particular a hard plastic material.

FIG. 2 to FIG. 17 show alternative embodiments of the drilling tool 10 in a cross section. The drilling tools in these figures are small drilling tools 11, which differ in terms of the configuration of the basic body 32 in the transporting region 22 and the configuration of the covering element 34.

Figure 2:
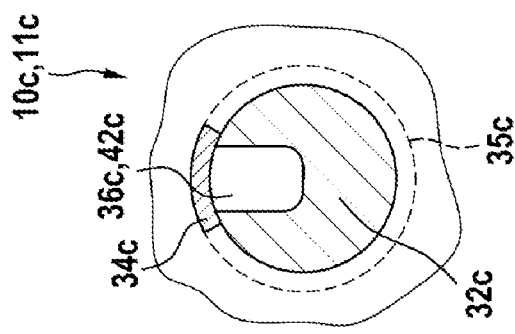

FIG. 2 shows a cross section of the drilling tool 10a in the transporting region 22a.

The basic body 32a has a single groove 42a, which by way of example has a flat form. The flat groove 42a has a planar groove base which is laterally not delimited by the basic body 32a.

By way of example, the covering element 34a has the form of an arc of a circle and has a single gap 35a. The gap 35a takes up an angle range of approx. 180°.

The covering element 34a is materially bonded to the basic body 32a and terminates the transporting channel 36a.

Figure 3:
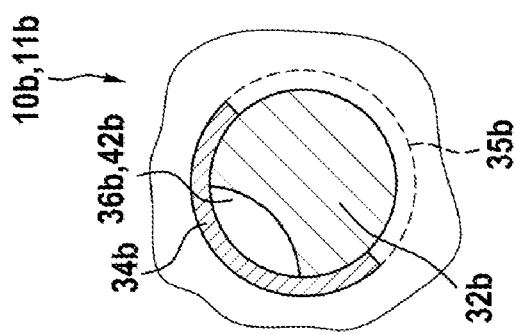

FIG. 3 shows a cross section of the drilling tool 10b in the transporting region 22b. The basic body 32b has a single groove 42b, which has a concave form. The concave groove 42b has a curved groove base which is laterally delimited by the basic body 32b.

By way of example, the covering element 34b has the form of an arc of a circle and has a single gap 35b. The gap 35b takes up an angle range of approx. 180°.

The covering element 34b is materially bonded to the basic body 32b and terminates the transporting channel 36b.

Figure 4:
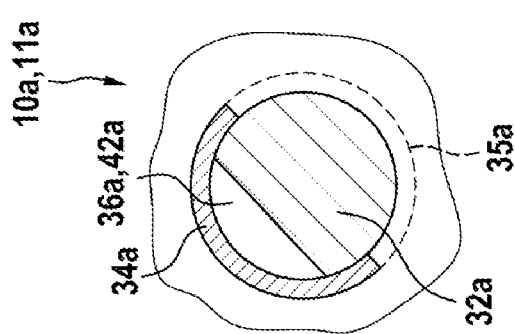

FIG. 4 shows a cross section of the drilling tool 10c in the transporting region 22c.

The basic body 32c has a single groove 42c, which has a flat form. The flat groove 42c has a planar groove base which is laterally delimited by the basic body 32c.

By way of example, the covering element 34c has the form of an arc of a circle and has a single gap 35c. The gap 35c takes up an angle range of approx. 300°.

The covering element 34c is materially bonded to the basic body 32c and terminates the transporting channel 36c.

Figure 5:
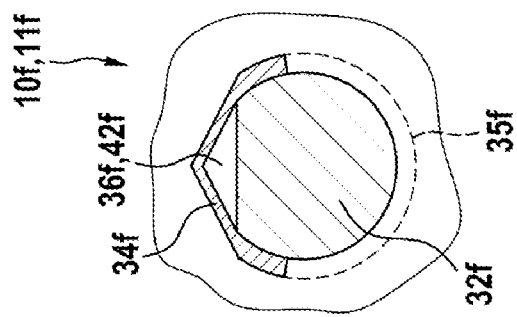

FIG. 5 shows a cross section of the drilling tool 10d in the transporting region 22d.

The basic body 32d has a hexagonal cross section. The basic body 32d has a single groove 42d, which has a flat form. The flat groove 42d has a planar groove base which is laterally not delimited by the basic body 32d.

By way of example, the covering element 34d has the form of an arc of a circle and has a single gap 35d. The gap 35d takes up an angle range of approx. 270°.

The covering element 34d is materially bonded to the basic body 32d in the region of the edges and terminates the transporting channel 36d.

Figure 6:
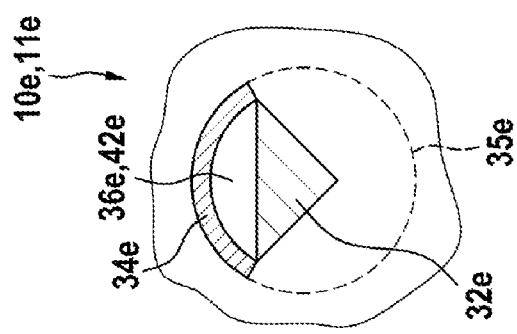

FIG. 6 shows a cross section of the drilling tool 10e in the transporting region 22e.

The basic body 32e has a triangular cross section. The basic body 32e has a single groove 42e, which has a flat form. The flat groove 42e has a planar groove base which is laterally not delimited by the basic body 32e.

By way of example, the covering element 34e has the form of an arc of a circle and has a single gap 35e. The gap 35e takes up an angle range of approx. 240°.

The covering element 34e is materially bonded to the basic body 32e in the region of the edges and terminates the transporting channel 36e.

Figure 7:
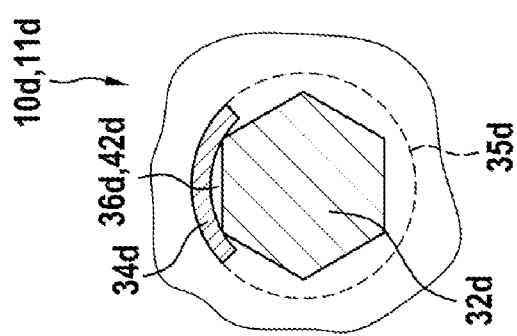

FIG. 7 shows a cross section of the drilling tool 10f in the transporting region 22f.

The basic body 32f has a single groove 42f, which has a flat form. The flat groove 42f has a planar groove base which is laterally not delimited by the basic body 32f.

When viewed in cross section, the covering element 34f has two bar-shaped portions, which run towards one another in the manner of a roof and which cover the transporting channel 36f, and two portions which are in the form of an arc of a circle and bear against the basic body 32f The gap 35f takes up an angle range of approx. 160°.

The covering element 34f is materially bonded to the basic body 32f in the region of the portions that are in the form of an arc of a circle and terminates the transporting channel 36f.

Figure 8:
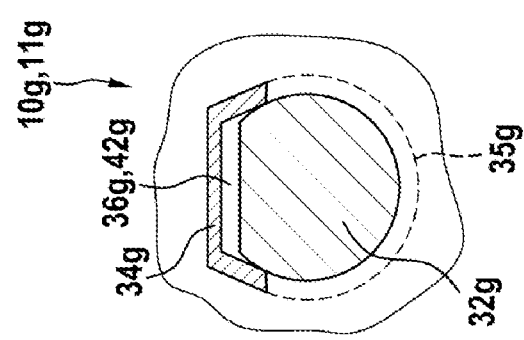

FIG. 8 shows a cross section of the drilling tool 10g in the transporting region 22g.

The basic body 32g has a single groove 42g, which has a flat form. The flat groove 42g has a planar groove base which is laterally not delimited by the basic body 32g.

The covering element 34g has three bar-shaped portions when viewed in cross section. Two opposite bar-shaped portions bear against the basic body 32g here and partially delimit the transporting channel 36g. A further bar-shaped portion between these two runs substantially parallel to the groove base and radially terminates the groove 42g. The gap 35g takes up an angle range of approx. 250°.

The covering element 34f is materially bonded to the basic body 32g in the region of the opposite bar-shaped portions and terminates the transporting channel 36g.

Figure 9:
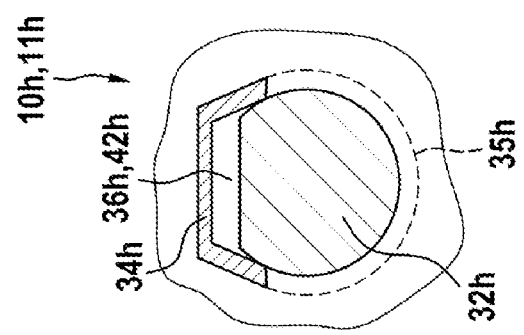

FIG. 9 shows a cross section of the drilling tool 10h in the transporting region 22h.

The covering element 34h in this figure differs from the covering element 34g described above in particular by a spacing of the bar-shaped portion running parallel to the groove base, which has a larger spacing and thereby enlarges the transporting channel 36h.

Figure 10:
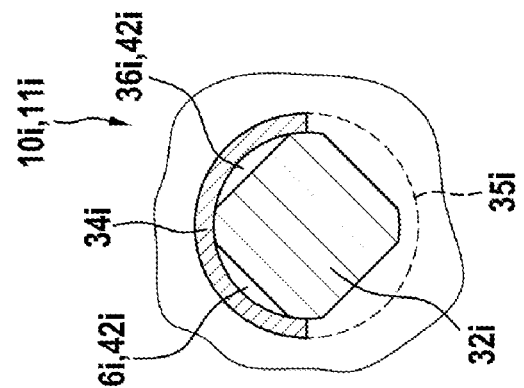

FIG. 10 shows a cross section of the drilling tool 10i in the transporting region 22i.

The basic body 32i has a substantially quadrilateral cross section. The basic body 32i has two grooves 42i, which have a flat form. The flat grooves 42i have a planar groove base which is laterally not delimited by the basic body 32i.

The covering element 34i is in the form of an arc of a circle and covers both grooves 42i. The gap 35i takes up an angle range of approx. 180°.

The covering element 34i is materially bonded to the basic body 32i in the region of the edges and terminates the transporting channels 36i.

Figure 11:
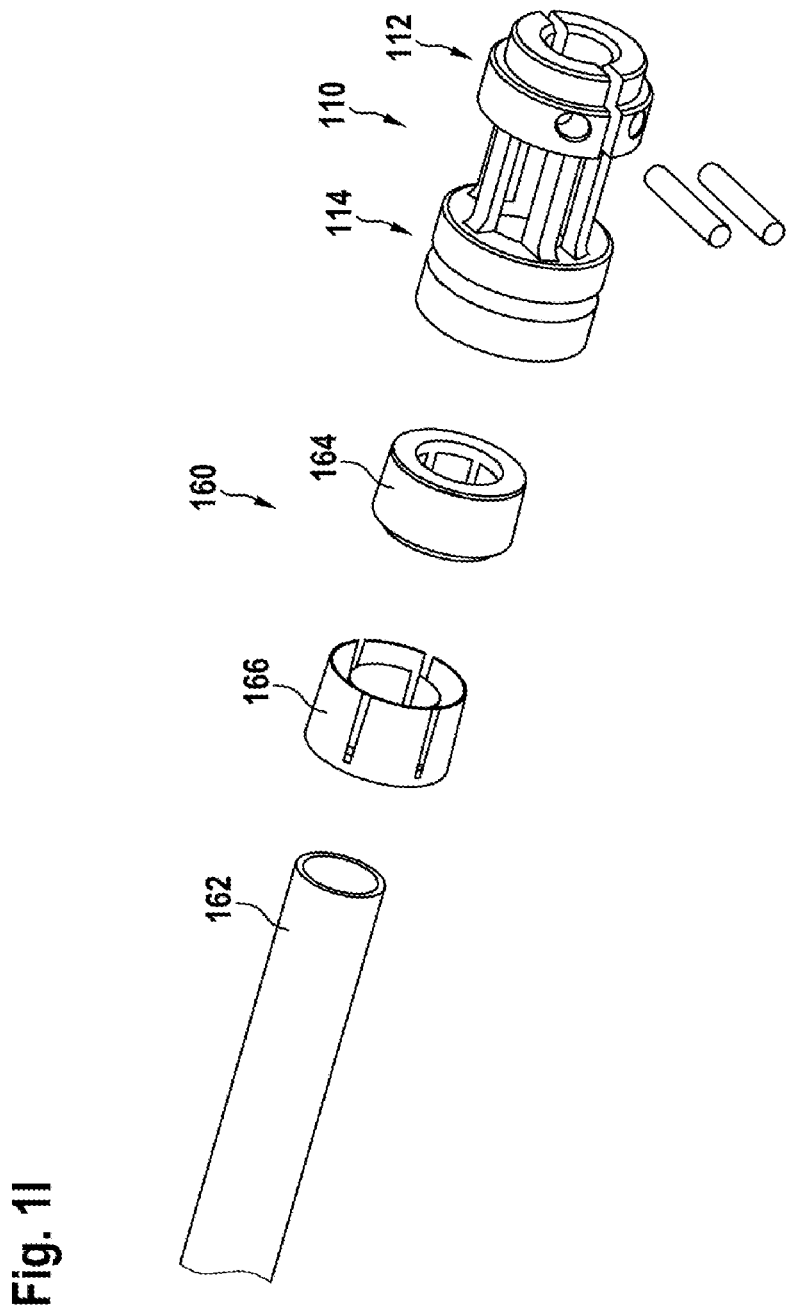

FIG. 11 shows a cross section of the drilling tool 10j in the transporting region 22j.

The basic body 32j has two grooves 42j, which have a concave form. The concave grooves 42j have a curved groove base which is laterally delimited by the basic body 32j.

The covering element 34j is in the form of an arc of a circle and covers both grooves 42j. The gap 35j takes up an angle range of approx. 60°.

The covering element 34j is materially bonded to the basic body 32j and terminates the transporting channels 36j.

FIG. 12 shows a cross section of the drilling tool 10k in the transporting region 22k.

The basic body 32k has a substantially hexagonal cross section. The basic body 32k has three grooves 42k, which have a flat form. The flat grooves 42k have a planar groove base which is laterally not delimited by the basic body 32k.

The covering element 34k is in the form of an arc of a circle and covers all the grooves 42k. The gap 35k takes up an angle range of approx. 120°.

The covering element 34k is materially bonded to the basic body 32i in the region of the edges and terminates the transporting channels 36k.

FIG. 13 shows a cross section of the drilling tool 10l in the transporting region 22l.

The basic body 32l has a substantially triangular cross section. The basic body 32l has two grooves 42l, which have a flat form. The flat grooves 42l have a planar groove base which is laterally not delimited by the basic body 32l.

The covering element 34l is in the form of an arc of a circle and covers all the grooves 42l. The gap 35k takes up an angle range of approx. 180°.

The covering element 34l is materially bonded to the basic body 32l in the region of all the edges and terminates the transporting channels 36l.

Figure 14:
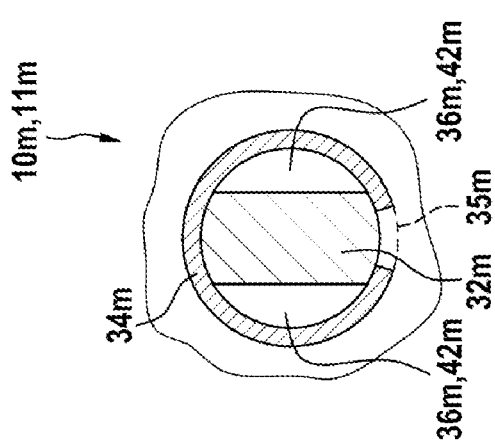

FIG. 14 shows a cross section of the drilling tool 10m in the transporting region 22m.

The basic body 32m has two grooves 42m, which have a flat form. The flat grooves 42m have a planar groove base which is laterally not delimited by the basic body 32m.

The covering element 34m is in the form of an arc of a circle and covers all the grooves 42m. The drilling tool 10m has a single covering element 32m which covers the two grooves 42m. The gap 35m takes up an angle range of approx. 35°.

The covering element 34m is materially bonded to the basic body 32m and terminates the transporting channels 36m.

Figure 15B:
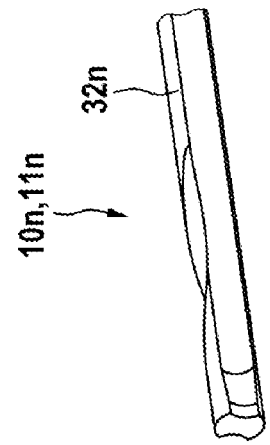
Figure 15A:
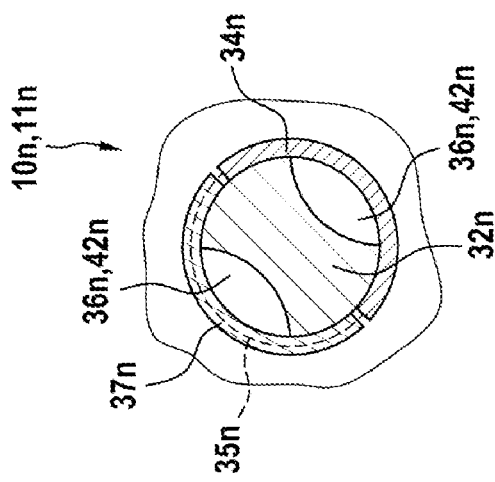

FIG. 15a shows a cross section of the drilling tool 10n in the transporting region 22n. FIG. 15b shows the basic body 32n of the drilling tool 10n in a perspective view.

The basic body 32n has two grooves 42n, which have a concave form. The concave grooves 42n have a curved groove base which is laterally delimited by the basic body 32n.

The two grooves 42n have different forms. One of the grooves 42n runs in a straight line and parallel to the longitudinal axis of the drilling tool 10n along the entire transporting region 22n. The other groove 42n begins in the region of the joining face for the drill head and extends helically around the longitudinal axis until it opens into the straight groove 42n.

The drilling tool 10n has two covering elements 34n, the further covering element 34n being arranged in the gap of the first covering element 34n. The covering elements 34n, 37n are in the form of an arc of a circle and are substantially identical to one another. The gap 35n takes up an angle range of greater than 180°, for example approx. 185°.

The covering elements 34n are materially bonded to the basic body 32n and terminates the transporting channels 36n.

Figure 17:
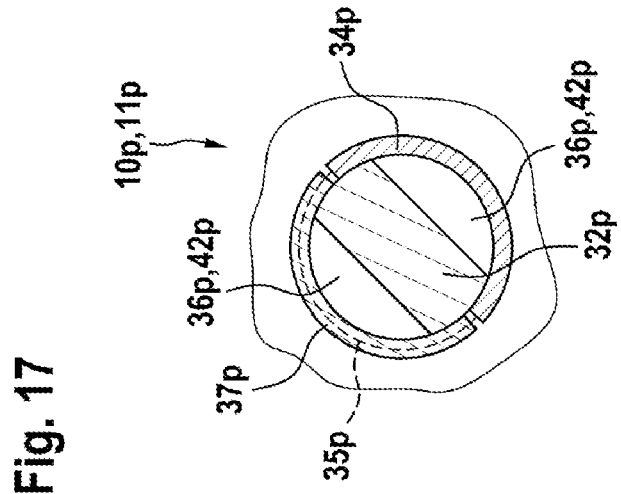
FIG. 16-17 show further alternative embodiments of a drilling tool with two covering elements in cross section.
Figure 16:
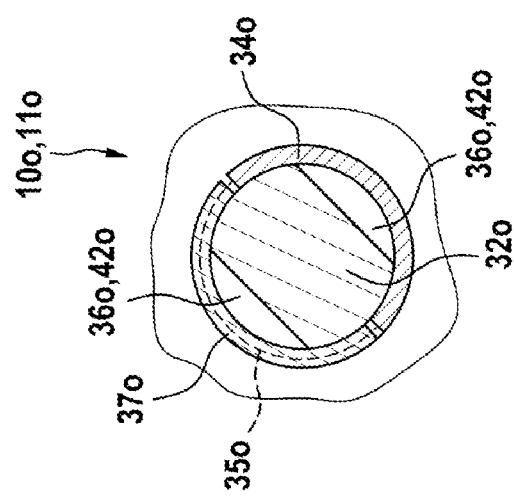

FIG. 16 and FIG. 17 show different embodiments of the drilling tool 10n. The drilling tool 10o in these figures has flat grooves 42o in contrast to the drilling tool 10n. The drilling tool 10p has larger grooves 42p than the drilling tool 10o, and therefore larger transporting channels 36p.

What is claimed is:

1. A suction-extraction adapter for a drilling tool, comprising:
   a housing having a suction-extraction device interface configured to detachably connect to a suction-extraction device; and
   a tool connection unit configured to axially fix to the drilling tool,
   wherein the housing has a locking mechanism, and
   wherein the tool connection unit is configured to be detachably connected to the housing via the locking mechanism.

2. The suction-extraction adapter according to claim 1, wherein the locking mechanism includes:
   an actuating element linearly movable relative to the housing to a first position and a second position, and
   a restoring element configured to apply a force to the actuating element that moves the actuating element to the first position, wherein in the first position of the actuating element the tool connection unit is locked to the housing by the locking mechanism, and wherein in the second position of the actuating element the tool connection unit is detachable from the housing without the use of tools.

3. The suction-extraction adapter according to claim 2, wherein the actuating element is in the form of an actuating sleeve.

4. The suction-extraction adapter according to claim 2, wherein:

the housing includes a main body, and the actuating element is mounted to the housing such that the actuating element moves linearly relative to the main body.

5. The suction-extraction adapter according to claim 2, wherein the actuating element is arranged in such a way that the suction-extraction device interface is designed such that it can be gripped by a user for the purpose of assisting actuating movement.

6. The suction-extraction adapter according to claim 1, wherein the suction-extraction device interface is in the form of a suction-extraction nozzle.

7. The suction-extraction adapter according to claim 1, wherein the locking mechanism includes a plurality of locking elements.

8. The suction-extraction adapter according to claim 7, wherein the plurality of locking elements includes a plurality of latching balls.

9. The suction-extraction adapter according to claim 1, wherein:

the tool connection unit includes a connection body, and the connection body includes (i) a tool interface configured to detachably connect to the drilling tool, and (ii) a housing interface configured to detachably connect to the housing.

10. The suction-extraction adapter according to one of claim 9, wherein the housing interface has an external peripheral groove corresponding to the locking mechanism of the housing.

11. The suction-extraction adapter according to claim 1, wherein:

the suction-extraction adapter has at least one form-fitting element for the purpose of axial fixing, and the form-fitting element is made from a metallic material.

12. A drilling tool having an adapter as claimed in claim 1.

13. A system comprising a drilling tool having:

a suction-extraction adapter according to claim 1; and a handheld power tool with a tool receptacle, wherein the tool receptacle has a locking mechanism which substantially corresponds to the locking mechanism of the suction-extraction adapter.

14. The system according to claim 13, wherein the locking mechanism of the suction-extraction adapter and the locking mechanism of the handheld power tool have substantially the same direction of actuation and the respective locking is carried out via latching balls.

15. A suction-extraction adapter for a drilling tool, comprising:

a housing having a suction-extraction device interface configured to detachably connect to a suction-extraction device; and a tool connection unit configured to axially fix to the drilling tool, wherein the housing has a locking mechanism, wherein the tool connection unit is configured to be locked to the housing via the locking mechanism, wherein the tool connection unit includes a connection body, and wherein the connection body includes (i) a tool interface configured to detachably connect to the drilling tool, and (ii) a housing interface configured to detachably connect to the housing, and wherein the connection body in the region of the tool interface has an elastic form such that the tool interface is configured to be spread open for the purpose of establishing a connection to the drilling tool.

16. The suction-extraction adapter according to claim 15, wherein the locking mechanism includes:

an actuating element, and a restoring element configured to apply a force to the actuating element.

17. The suction-extraction adapter according to claim 16, wherein the actuating element is in the form of an actuating sleeve.

18. The suction-extraction adapter according to claim 16, wherein:

the housing includes a main body, and the actuating element is mounted to the housing such that the actuating element moves linearly relative to the main body.

19. The suction-extraction adapter according to claim 16, wherein the actuating element is arranged in such a way that the suction-extraction device interface is designed such that it can be gripped by a user for the purpose of assisting actuating movement.

20. The suction-extraction adapter according to claim 15, wherein the suction-extraction device interface is in the form of a suction-extraction nozzle.

* * * * *